United States Patent
Griffith et al.

(10) Patent No.: US 11,338,480 B2
(45) Date of Patent: May 24, 2022

(54) APPARATUS AND METHOD FOR EMULATING TEMPERATURE DURING A THERMAL CURE CYCLE

(71) Applicant: The Boeing Company, Chicago, IL (US)

(72) Inventors: John M. Griffith, Wildwood, MO (US); Steven M. Shewchuk, St. Louis, MO (US); George E. Bible, Chesterfield, MO (US); Steven J. Plummer, Bothell, WA (US); Ryan M. Trella, University City, MO (US); Ronald J. Byington, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/015,555

(22) Filed: Sep. 9, 2020

(65) Prior Publication Data
US 2021/0039283 A1 Feb. 11, 2021

Related U.S. Application Data

(62) Division of application No. 15/495,454, filed on Apr. 24, 2017, now Pat. No. 10,800,072.

(51) Int. Cl.
*G01K 3/00* (2006.01)
*G01K 1/00* (2006.01)
(Continued)

(52) U.S. Cl.
CPC .......... *B29C 35/0288* (2013.01); *G01K 1/08* (2013.01); *G01K 1/16* (2013.01); *G01K 3/14* (2013.01);
(Continued)

(58) Field of Classification Search
USPC ........................ 374/134, 111, 110, 137, 208
See application file for complete search history.

(56) References Cited

U.S. PATENT DOCUMENTS 9,068,894 B2   6/2015   Nelson
9,304,048 B2   4/2016   Nelson et al.
(Continued)

FOREIGN PATENT DOCUMENTS

CN        1343162      4/2002
CN      101570065     11/2009
(Continued)

OTHER PUBLICATIONS

Translation of JP2012-000941A (Year: 2012).*
(Continued)

*Primary Examiner* — Mirellys Jagan
(74) *Attorney, Agent, or Firm* — Walters & Wasylyna LLC

(57) ABSTRACT

A method including steps of (1) heating, with a heating system, an apparatus comprising an enclosure assembly and a temperature emulation assembly positioned within said enclosure assembly; (2) thermally isolating said temperature emulation assembly from said heating system with said enclosure assembly; (3) permitting conductive heat transfer to said temperature emulation assembly only through an enclosure assembly-leading end of said enclosure assembly; and (4) representing a hottest temperature and a coldest temperature of an article being emulated by said apparatus with said temperature emulation assembly.

20 Claims, 18 Drawing Sheets

(51) Int. Cl.
*B29C 35/02* (2006.01)
*G01K 1/08* (2021.01)
*G01K 1/16* (2006.01)
*G01K 3/14* (2006.01)
*G01K 13/10* (2006.01)
*G01K 7/42* (2006.01)

(52) U.S. Cl.
CPC ....... *G01K 13/10* (2013.01); *G01K 2007/422* (2013.01); *G01K 2213/00* (2013.01)

(56) References Cited

U.S. PATENT DOCUMENTS

| | | | |
|---|---|---|---|
| 2005/0173820 A1* | 8/2005 | Schneider | B29C 35/0288 264/40.1 |
| 2006/0249885 A1 | 11/2006 | Stacey et al. | |
| 2009/0169918 A1 | 7/2009 | Haynes et al. | |
| 2010/0140842 A1* | 6/2010 | Nelson | F28D 15/00 264/327 |
| 2014/0146853 A1 | 5/2014 | Nelson | |
| 2014/0146855 A1 | 5/2014 | Nelson et al. | |
| 2015/0253202 A1 | 9/2015 | Nelson | |
| 2016/0069828 A1 | 3/2016 | Guinan et al. | |

FOREIGN PATENT DOCUMENTS

| | | |
|---|---|---|
| CN | 102802905 | 11/2012 |
| CN | 103139949 | 6/2013 |
| CN | 205905440 | 1/2017 |
| CN | 106426978 | 2/2017 |
| CN | 206496848 | 9/2017 |
| FR | 2708228 | 2/1995 |
| JP | S56113425 | 9/1981 |
| JP | S63-117249 | 5/1988 |
| JP | H7-146189 | 6/1995 |
| JP | 3024897 | 3/2000 |
| JP | 2004082644 | 3/2004 |
| JP | 2012-000941 | 1/2012 |
| WO | WO 96/04536 | 2/1996 |
| WO | WO 0054949 | 9/2000 |

OTHER PUBLICATIONS

China National Intellectual Property Administration, Office Action, with English translation, App. No. 201810251021.9 (dated Mar. 24, 2021).

Japan Patent Office, Office Action, with English translation, App. No. 2018-081935 (dated Apr. 5, 2022).

* cited by examiner

APPARATUS AND METHOD FOR EMULATING TEMPERATURE DURING A THERMAL CURE CYCLE

PRIORITY

This application is a divisional of U.S. Ser. No. 15/495,454 filed on Apr. 24, 2017.

FIELD

The present disclosure is generally related to fabrication of composite structures and, more particularly, to apparatus and methods for emulating a temperature of a composite structure and/or forming tool throughout a thermal cure cycle.

BACKGROUND

Thermal curing of a composite refers to the toughening or hardening of the polymer matrix material of the composite by cross-linking of polymer chains brought about by the application of heat and, optionally, pressure, for example, using an autoclave or an oven. One of the primary goals of the thermal cure process is to fully cure the thermoset polymer matrix material (e.g., resin) by initiating and sustaining specific chemical reactions.

Typically, a composite structure is assumed to have reached a full cure when certain prescribed time and temperature goals are achieved. In order to achieve these goals, various processing parameters (e.g., time and temperature within the autoclave or oven) are tightly controlled. This controlled process requires accurate measurement of temperature extremes (e.g., the hottest and coldest temperatures) of the composite structure and, optionally, a composite forming tool throughout the thermal cure cycle. It may also be beneficial to accurately measure gas temperature within the autoclave or oven during the thermal cure cycle.

Temperature measurements are typically determined using temperature sensors (e.g., thermocouples) applied to the composite structure and/or the forming tool to measure the coldest and hottest areas of the composite structure and/or the forming tool throughout the thermal cure cycle. As an example, a number of temperature sensors may be placed within the composite structure to measure temperatures at different locations of the composite structure that represent the thermal response of the composite structure. As another example, a number of temperature sensors may be placed on a surface of the forming tool, and covered with at least one ply of a dry fiberglass or elastomer material, to measure temperatures at different locations of the forming tool that are correlated to the thermal response of the composite structure. As yet another example, a number of temperature sensors may be placed within a thermal mass positioned on the forming tool to measure temperatures at different locations of the thermal mass that are correlated to the thermal response of the composite structure.

Conventional thermal curing control systems are hard wired to the temperature sensors and utilize a feedback algorithm to monitor and control the heat source throughout each thermal cure cycle based on the temperature measurement inputs from the temperature sensors. This method of temperature monitoring and control requires a thermal profile to be calculated, which involves significant trial and error, in order to identify representative locations on the composite structure and/or forming tool. The thermal profile is used to characterize the temperature extremes and match those temperatures to locations that represent the hottest and coldest temperatures of the composite structure and/or forming tool. Failure to properly identify the locations that adequately track the temperatures of the composite structure and/or the forming tool may lead to defects. Further, accurate placement of the temperature sensors in the prescribed locations and inspection of each composite structure being fabricated is a time-consuming and labor-intensive process.

Various other disadvantages also exist for this method of temperature monitoring. As an example, temperature sensors have a limited life cycle (e.g., typically between about 5 to 10 thermal cycles). At their end of life, the tooling must be taken out of production to replace the temperature sensors. Depending upon the location of the temperature sensors, this process may be difficult and time consuming. As another example, a temperature sensor may disengage before its end of life, which also requires taking the tooling out of service for replacement of the temperature sensor. As another example, the fiberglass or elastomer ply covering the temperature sensor may come off during the thermal cure cycle, which also requires taking the tooling out of service for replacement of the temperature sensor. As another example, temperature sensors placed in the trim of the composite structure may increase the possibility of defects forming during the thermal cycle. Temperature sensors placed in a thermal mass may have limited application, for example, due to the geometry and/or materials of the composite structure and/or forming tool and gas velocities and directions within the autoclave or oven.

Accordingly, those skilled in the art continue with research and development efforts in the field of composite fabrication.

SUMMARY

In an example, the disclosed apparatus includes a enclosure assembly including an enclosure assembly-leading end and an opposed enclosure assembly-lagging end, and a temperature emulation assembly mounted within the enclosure assembly and including a temperature emulation assembly-leading end located proximate to the enclosure assembly-leading end and a temperature emulation assembly-lagging end spaced away from the enclosure assembly-lagging end. The enclosure assembly thermally isolates the temperature emulation assembly. The enclosure assembly permits conductive heat transfer to the temperature emulation assembly only through the enclosure assembly-leading end.

In an example, the disclosed method for controlling heat transfer includes the steps of: (1) heating an apparatus including an enclosure assembly and a temperature emulation assembly positioned within the enclosure assembly, (2) permitting conductive heat transfer to the temperature emulation assembly through an enclosure assembly-leading end of the apparatus, (3) inhibiting the conductive heat transfer to the temperature emulation assembly along any conductive heat transfer path except through the enclosure assembly-leading end of the apparatus, (4) inhibiting convective heat transfer to the temperature emulation assembly along any convective heat transfer path, and (5) inhibiting radiative heat transfer to the temperature emulation assembly along any radiative heat transfer path.

In an embodiment, the disclosed method for emulating an article includes the steps of: (1) heating, with a heating system, an apparatus including an enclosure assembly and a temperature emulation assembly positioned within the enclosure assembly, (2) thermally isolating the temperature emulation assembly from the heating system with the enclosure assembly, (3) permitting conductive heat transfer to the temperature emulation assembly only through an enclosure assembly-leading end of the enclosure assembly, and (4) representing a hottest temperature and a coldest temperature of an article being emulated by the apparatus with the temperature emulation assembly.

Other examples of the disclosed apparatus and method will become apparent from the following detailed description, the accompanying drawings and the appended claims.

DETAILED DESCRIPTION

Figure 1:
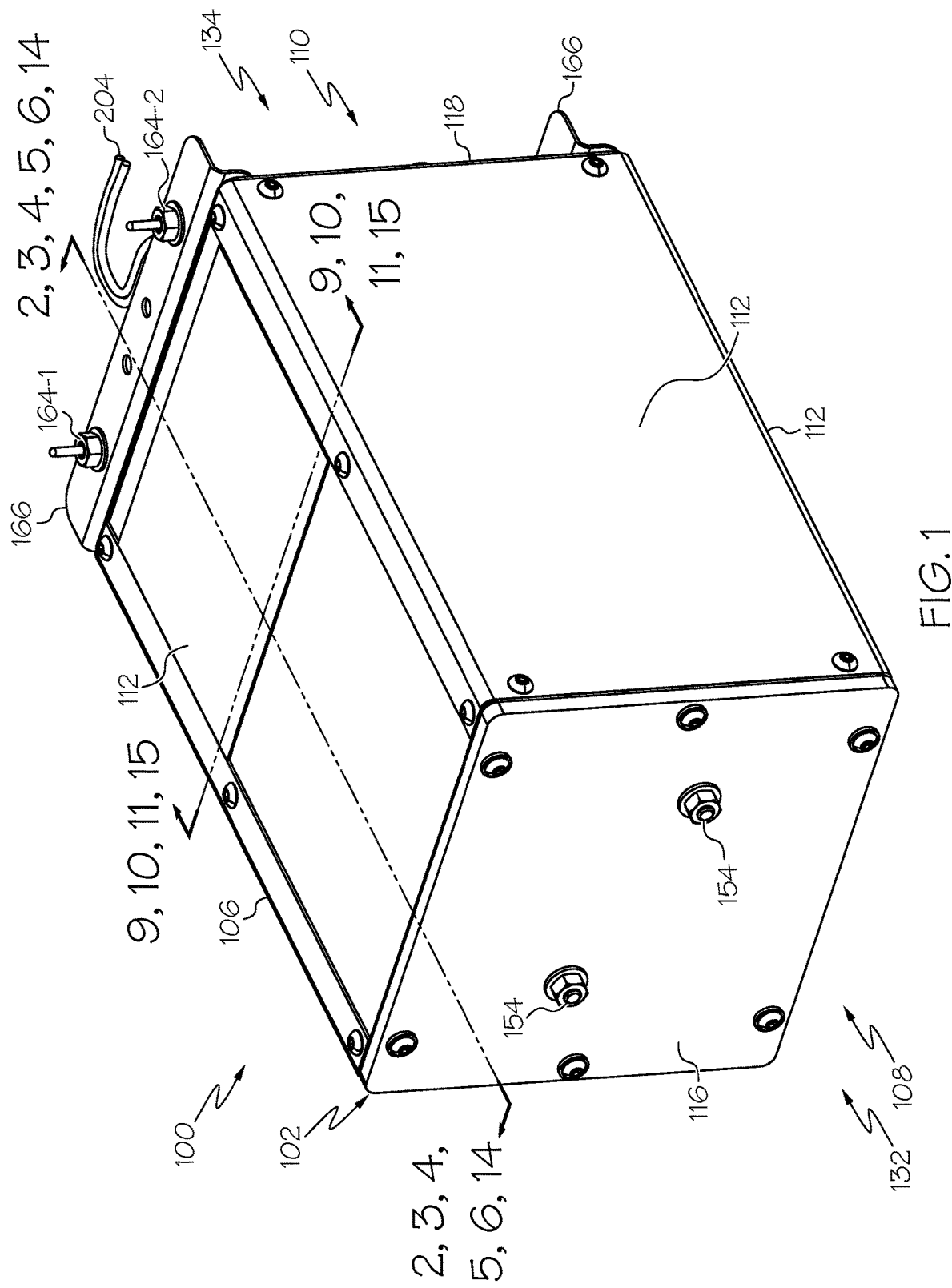
FIG. 1 is a schematic perspective view of an example of the disclosed apparatus for emulating temperature.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

Illustrative, non-exhaustive examples, which may be, but are not necessarily, claimed, of the subject matter according the present disclosure are provided below.

The present disclosure recognizes and takes into account that the thermal cure of composite structures (e.g., composite parts, components, etc.) requires accurate temperature measurement and control of the temperature extremes (e.g., hottest and coldest temperatures) on the composite structure and/or a composite forming tool and, optionally, a gas temperature, within a thermal curing system (e.g., an autoclave or oven) having variable pressures and unknown gas velocities and gas directions. These temperature measurements are used as inputs for control of the heat source of the thermal curing system so that acceptable cure requirements are met.

The present disclosure also recognizes and takes into account that many variables must be accounted for when taking temperature measurements. As an example, temperature measurements may be made on composite structures having various dimensions, for example, ranging from less than about 1 in$^2$ (6.5 cm$^2$) to more than about 1,500 ft$^2$ (140 m$^2$). As another example, temperature measurements may be made on the forming tools for composite structures made from various materials, for example, metal such as aluminum, steel, nickel, nickel-iron alloy (e.g., Invar), polymer matrix composite, foam and thermoplastic. As another example, temperature measurements may be made under various gas characteristics within the thermal curing system, for example, gas pressures ranging from less than about 3 psi (21 kPa) to more than about 300 psi (2,068 kPa), gas flow velocities ranging from less than about 1 ft/s (0.3 m/s) to more than about 200 mph (89 m/s), and different gas flow directions such as direct impingement, laminar flow over a surface and blocked flow.

The present disclosure also recognizes and takes into account that it may be difficult to account for heat transfer due to convection and/or radiation from the heat source of the thermal curing system because no two composite structures and/or forming tools have the same thermal responses, no two thermal curing systems (e.g., autoclaves or ovens) have the same thermal response and different locations within the same thermal curing system may have different thermal responses.

Therefore, disclosed is an apparatus and method for emulating temperature of a composite structure and/or a forming tool (e.g., providing temperatures representative of the hottest and coldest areas of the composite structure and/or tool) during a thermal cure cycle, without alteration to the composite structure and/or the forming tool. The disclosed apparatus and method may find beneficial application for emulating temperatures during a thermal cure cycle for composite structures having any dimensions, forming tools made from any materials, thermal curing systems (e.g., autoclaves or ovens) having any operating pressures, any gas velocities and/or any gas directions.

Referring to FIGS. 1-15, examples of the disclosed apparatus for emulating temperature, generally designated as the apparatus 100, are illustrated. The apparatus 100 includes an enclosure assembly 102 and a temperature emulation assembly 104 disposed within the enclosure assembly 102. The temperature emulation assembly 104 is a passive device (e.g., no electronic or moving parts) that emulates the temperature of an emulated article as the emulated article is heated and, optionally, cooled.

In an example implementation, the temperature emulation assembly 104 emulates the composite structure and/or a forming tool (i.e., the emulated article or articles) and temperature measurements taken of the temperature emulation assembly 104 represent temperatures of the composite structure and/or the forming tool as the composite structure is being thermally cured within the thermal curing system (e.g., an autoclave or an oven). The temperatures measured for the temperature emulation assembly 104 of the apparatus 100 may correlated to the temperatures of the composite structure and may be used to create a temperature profile, or thermal profile, representing the composite structure and/or the forming tool throughout the thermal curing process. Additionally, temperature extremes measured for the temperature emulation assembly 104 of the apparatus 100 represent the temperature extremes of the composite structure and may be used as inputs for control of the thermal curing system.

The enclosure assembly 102 includes features configured to control the transfer of heat to the temperature emulation assembly 104. As an example, the enclosure assembly 102 controls a direction of conductive heat transfer (conduction) to the temperature emulation assembly 104. As another example, the enclosure assembly 102 controls a rate of conductive heat transfer to the temperature emulation assembly 104. As another example, the enclosure assembly 102 limits or inhibits convective heat transfer (convection) to the temperature emulation assembly 104. As yet another example, the enclosure assembly 102 limits or inhibits radiative heat transfer (radiation) to the temperature emulation assembly 104.

During a thermal cure cycle, one or more apparatus 100 may be placed within the thermal curing system (e.g., autoclave or oven) in proximity of a corresponding composite structure being thermally cured and/or the forming tool supporting the composite structure. The apparatus 100 not need to be in direct contact with the corresponding composite structure and/or forming tool. A controller of the thermal curing system uses temperature output from the apparatus 100 as input to monitor the temperature of the composite structure and/or forming tool and regulate the temperature of the thermal curing system (e.g., control a heat source of the thermal curing system) throughout the prescribed thermal curing cycle.

Referring to FIG. 1, the apparatus 100 includes a leading (e.g., first) end 132 (also referred to as an apparatus leading end) and a lagging (e.g., second) end 134 (also referred to as an apparatus lagging end) longitudinally opposed to the leading end 134. Generally, during use of the apparatus 100, heat is conductively transferred along a path initiating at the leading end 132 of the apparatus 100 and directed toward the lagging end 134 of the apparatus 100 (e.g., conduction is directed from the leading end 132 to the lagging end 134). Therefore, throughout the present disclosure, the term "leading end" refers to an end at which conductive heat transfer is initiated and through which conductive heat transfer is directed. Similarly, throughout the present disclosure, the term "lagging end" refers to an end opposite the leading end. Additionally, those skilled in the art will recognize that depending upon the orientation of the apparatus 100 during use, the terms leading end and lagging end may refer to a front end, a rear end, an upper end, a lower end, etc.

FIGS. 2-6 are schematic illustrations of examples of the disclosed apparatus 100. In FIGS. 2-6, the enclosure assembly 102 is shown in longitudinal cross-section.

In an example, the enclosure assembly 102 includes an outer enclosure 106. The outer enclosure 106 includes an outer enclosure leading (e.g., first) end 108 (also referred to as an outer enclosure-leading end) and a lagging (e.g., second) end 110 (also referred to as an outer enclosure-lagging end) longitudinally opposed to the leading end 108. The outer enclosure 106 defines an outer volume 128.

Figure 9:
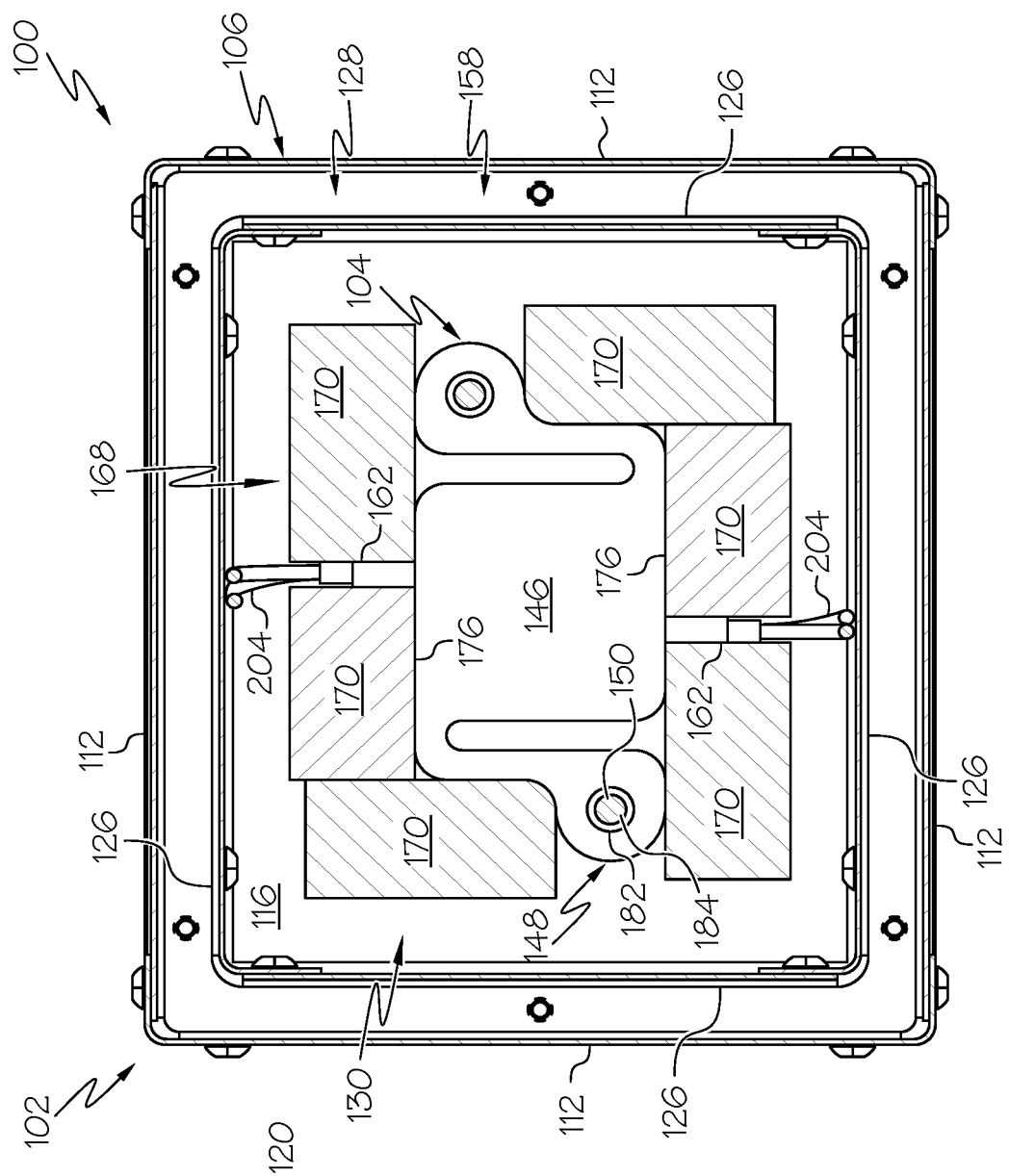
FIG. 9 is a schematic end elevation view, in partial transverse cross-section, of another example of the disclosed apparatus.
Figure 10:
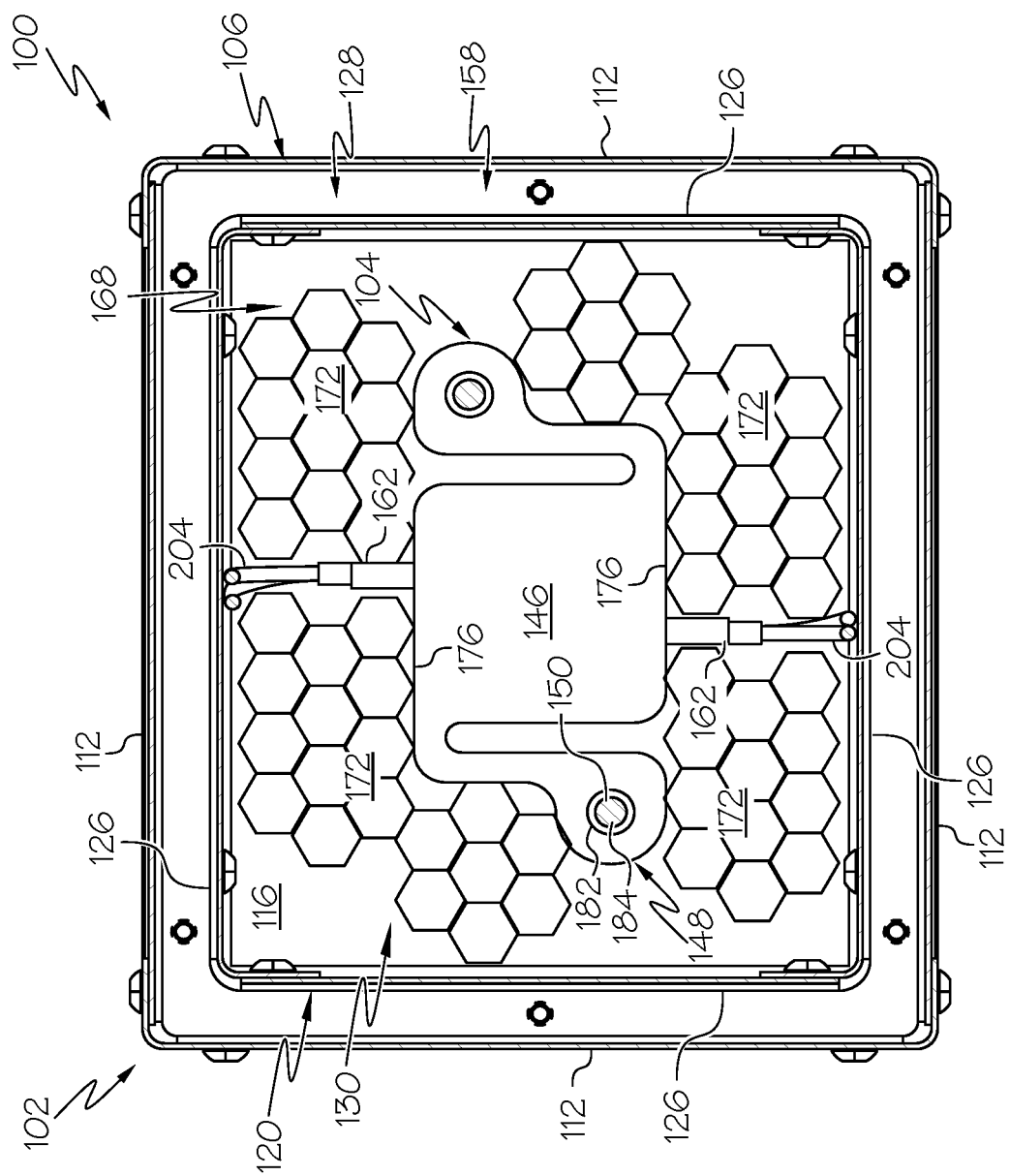
FIG. 10 is a schematic end elevation view, in partial transverse cross-section, of another example of the disclosed apparatus.
Figure 11:
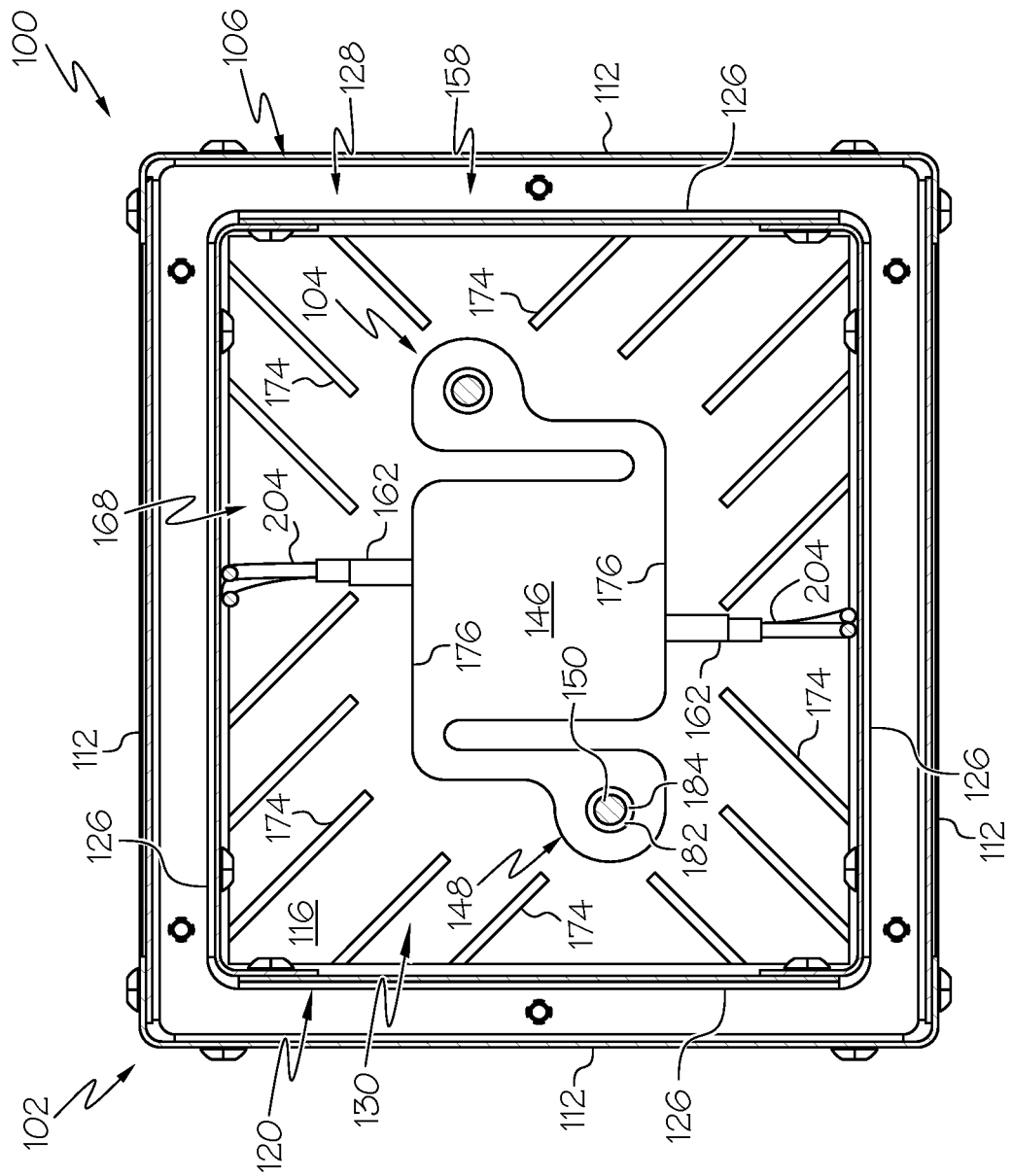
FIG. 11 is a schematic end elevation view, in partial transverse cross-section, of another example of the disclosed apparatus.

In an example, the outer enclosure 106 is a six-sided enclosure having a rectangular shape in longitudinal cross-section (e.g., FIGS. 2-6) and a rectangular shape in transverse cross-section (e.g., FIGS. 9-11). As an example, the outer enclosure 106 includes a plurality of (e.g., four) sidewalls 112 (also referred to as outer enclosure-sidewalls). The outer enclosure 106 also includes a leading end faceplate 116 (also referred to as an outer enclosure-leading end faceplate) connected to a leading end of the sidewalls 112 and enclosing the leading end 108 of the outer enclosure 106. The outer enclosure 106 also includes a lagging end faceplate 118 (also referred to as an outer enclosure-lagging end faceplate) connected to a lagging end of the sidewalls 112 and enclosing the lagging end 110 of the outer enclosure 106. In other examples, the outer enclosure 106 may have various other structural configurations and/or geometric shapes (e.g., square, circular, etc.) in cross-section, without limitation.

Referring still to FIGS. 2-6, in an example, the enclosure assembly 102 also includes an inner enclosure 120. The inner enclosure 120 is mounted to the outer enclosure 106 within the outer volume 128. The inner enclosure 120 includes a leading (e.g., first) end 122 (also referred to as an inner enclosure-leading end) and a lagging (e.g., second) end 124 (also referred to as an inner enclosure-lagging end) longitudinally opposed to the leading end 122. The inner enclosure 120 defines an inner volume 130.

In an example, the inner enclosure 120 is a four-sided enclosure having a rectangular shape in longitudinal cross-section (e.g., FIGS. 2-6) and a rectangular shape in transverse cross-section (e.g., FIGS. 9-11). As an example, the inner enclosure 120 includes a plurality of (e.g., four) sidewalls 126 (also referred to as inner enclosure-sidewalls). The inner enclosure 120 also includes a lagging end faceplate 136 (also referred to as an inner enclosure-lagging end faceplate) connected to a lagging end of the sidewalls 126 and enclosing the lagging end 124 of the inner enclosure 120. In the illustrative example, the inner enclosure 120 does not include an inner enclosure-leading end faceplate connected to a leading end of the sidewalls 126. Rather, as an example, the leading end of the sidewalls 126 are connected to the leading end faceplate 116 of the outer enclosure 106, which encloses the leading end 122 of the inner enclosure 120. In other words, as an example and as illustrated in FIGS. 2-6, the leading end 122 of the inner enclosure 120 is open to allow unobstructed conductive heat transfer through the leading end 108 of the outer enclosure 106 (e.g., conductively through the leading end faceplate 116 of the outer enclosure 106) to the temperature emulation assembly 104. In other examples, the inner enclosure 120 may have various other structural configurations and/or geometric shapes in cross-section, without limitation.

In an example, the shape (e.g., in cross-section) of the inner enclosure 120 and the shape (e.g., in cross-section) of the outer enclosure 106 may be the same (e.g., the shape of the inner enclosure 120 matches the shape of the outer enclosure 106). In another example, the shape of the inner enclosure 120 and the shape of the outer enclosure 106 may be different.

In an example, the inner enclosure 120 is disposed toward the leading end 108 of the outer enclosure 106. As an example, the leading end 122 of the inner enclosure 120 is positioned proximate to (e.g., at or near) the leading end 122 of the outer enclosure 106 and the lagging end 124 of the inner enclosure 120 is spaced away from the lagging end 110 of the outer enclosure 106. As an example, the sidewalls 126 of the inner enclosure 120, at the leading end 122, may abut and be in contact with the leading end faceplate 116 of the outer enclosure 106, such that the leading end faceplate 116 encloses the leading end 122 of the inner enclosure 120.

In an example, the sidewalls 126 of the inner enclosure 120 are spaced away from and located inward relative to the sidewalls 112 of the outer enclosure 106. As an example, the enclosure assembly 102 may include a plurality of spacers 138 positioned between the sidewalls 126 of the inner enclosure 120 and the sidewalls 112 of the outer enclosure 106. The spacers 138 set and maintain the distance between the sidewalls 126 and the sidewalls 112.

In an example, the inner enclosure 120 is connected to the outer enclosure 106. As an example, at least one of the sidewalls 126 of the inner enclosure 120 is connected to at least one of the sidewalls 112 of the outer enclosure 106. As an example, a fastener 140 (e.g., a nut and bolt, a rivet, etc.) may connect the sidewalls 126 of the inner enclosure 120 to the sidewalls 112 of the outer enclosure 106. As shown in the illustrative example, the fastener 140 may pass through the spacer 138 and interconnect the sidewalls 126 of the inner enclosure 120 and the sidewalls 112 of the outer enclosure 106.

Referring still to FIGS. 2-6, in an example, the temperature emulation assembly 104 is mounted to the outer enclosure 106 within the inner volume 130 of the inner enclosure 120. The temperature emulation assembly 104 includes a plurality of thermally conductive plates 146 arranged in a stack 148. As will be described in more detail herein, in another example, the temperature emulation assembly 104 also includes a plurality of insulator layers 178 arranged in the stack 148. As such, throughout the present disclosure, the stack 148 may refer to the stacked arrangement of the plurality of thermally conductive plates 146 or the stacked arrangement of the plurality of thermally conductive plates 146 and the plurality of insulator layers 178. The temperature emulation assembly 104, or the stack 148, includes a leading (e.g., first) end 142 (also referred to as a temperature emulation assembly-leading end or a stack-leading end) and a longitudinally opposed lagging (e.g., second) end 144 (also referred to as a temperature emulation assembly-lagging end or a stack-lagging end).

In an example, the temperature emulation assembly 104 is disposed toward the leading end 132 of the enclosure assembly 102. As an example, the stack 148 is disposed toward the leading end 108 of the outer enclosure 106. As an example, the leading end 142 of the stack 148 is positioned proximate to (e.g., at or near) the leading end 122 of the outer enclosure 106 and the lagging end 144 of the stack 148 is spaced away from the lagging end 124 of the inner enclosure 120. As an example, and as illustrated in FIGS. 2-6, one of the thermally conductive plates 146 located at the leading end 142 of the stack 148 (e.g., a leading-most thermally conductive plate 146) may abut an inner surface of the leading end faceplate 116 of the outer enclosure 106.

In an example, each thermally conductive plate 146 of the stack 148 is configured for connection of at least one temperature sensor 162. As an example, at least one temperature sensor 162 is connected to the thermally conductive plate 146 to measure the temperature of the associated thermally conductive plate 146 throughout the thermal cure cycle. As examples, the temperature sensor 162 may be a thermocouple, a thermistor or another suitable temperature sensor.

In an example, the temperature emulation assembly 104 may provide for redundant temperature measurements of the thermally conductive plates 146. As an example, two temperature sensors 162, identified individually as a primary (e.g., first) temperature sensor 162-1 (FIG. 4) and a secondary (e.g., second) temperature sensor 162-2 (FIG. 4), may be connected to each of the selected thermally conductive plates 146. As an example, the primary temperature sensor 162-1 may be located on or connected to one (e.g., a first) side 176 of the selected thermally conductive plate 146 and the secondary temperature sensor 162-2 may be located on or connected to an opposed one (e.g., a second) side 176 of the selected thermally conductive plate 146. In such a manner, the pair of redundant temperature sensors 162 provides two temperature measurements of the same thermally conductive plate 146.

In an example, the apparatus 100 also includes at least one gas temperature sensor 164. As an example, at least one gas temperature sensor 164 is connected to an exterior of the outer enclosure 106. As an example, the outer enclosure 106 may include at least one tab 166 extending outwardly from the lagging end 110 of the outer enclosure 106. In this example, the gas temperature sensor 164 is connected to the tab 166. The gas temperature sensor 164 measures the temperature of the gas within the thermal curing system throughout the thermal cure cycle. As examples, the gas temperature sensor 164 may be a thermocouple, a resistance temperature detector or another suitable gas temperature sensor.

In an example, the temperature emulation assembly 104 may provide for redundant temperature measurements of the gas within the thermal curing system. As an example, and as illustrated in FIG. 1, two gas temperature sensors 164, identified individually as a primary (e.g., a first) gas temperature sensor 164-1 and a secondary (e.g., a second) gas temperature sensor 164-2, may be connected to the exterior of the outer enclosure 106. In such a manner, the pair of redundant gas temperature sensors 164 provides two temperature measurements of the gas within the thermal curing system.

In an example, the apparatus 100 includes a pair of tabs 166. As an example, each tab 166 of the pair of tabs 166 is located proximate to opposing corners, or edges, of the outer enclosure 106 at the lagging end 110, for example, formed by an intersection of the lagging end faceplate 118 and sidewalls 112 of the outer enclosure 106. One or both of the tabs 166 may serve as an integral attachment feature, such as to connect additional sensors (e.g., gas temperature sensors 164) to the apparatus 100 or to connect the apparatus 100 to another object. The tabs 166 may also serve as an obstruction to convective heat transfer and/or radiative heat transfer around the lagging end 110 of the outer enclosure 106. One of the tabs 166, for example, a lower one of the tabs 166, may also serve as a strain relief to wires 204 connected to the temperature sensors 162 and extending outwardly from the lagging end faceplate 118 of the outer enclosure 106. One of the tabs 166, for example, an upper one of the tabs 166, may also serve as a strain relief to wires 206 connected to the gas temperature sensors 164.

Figure 2:
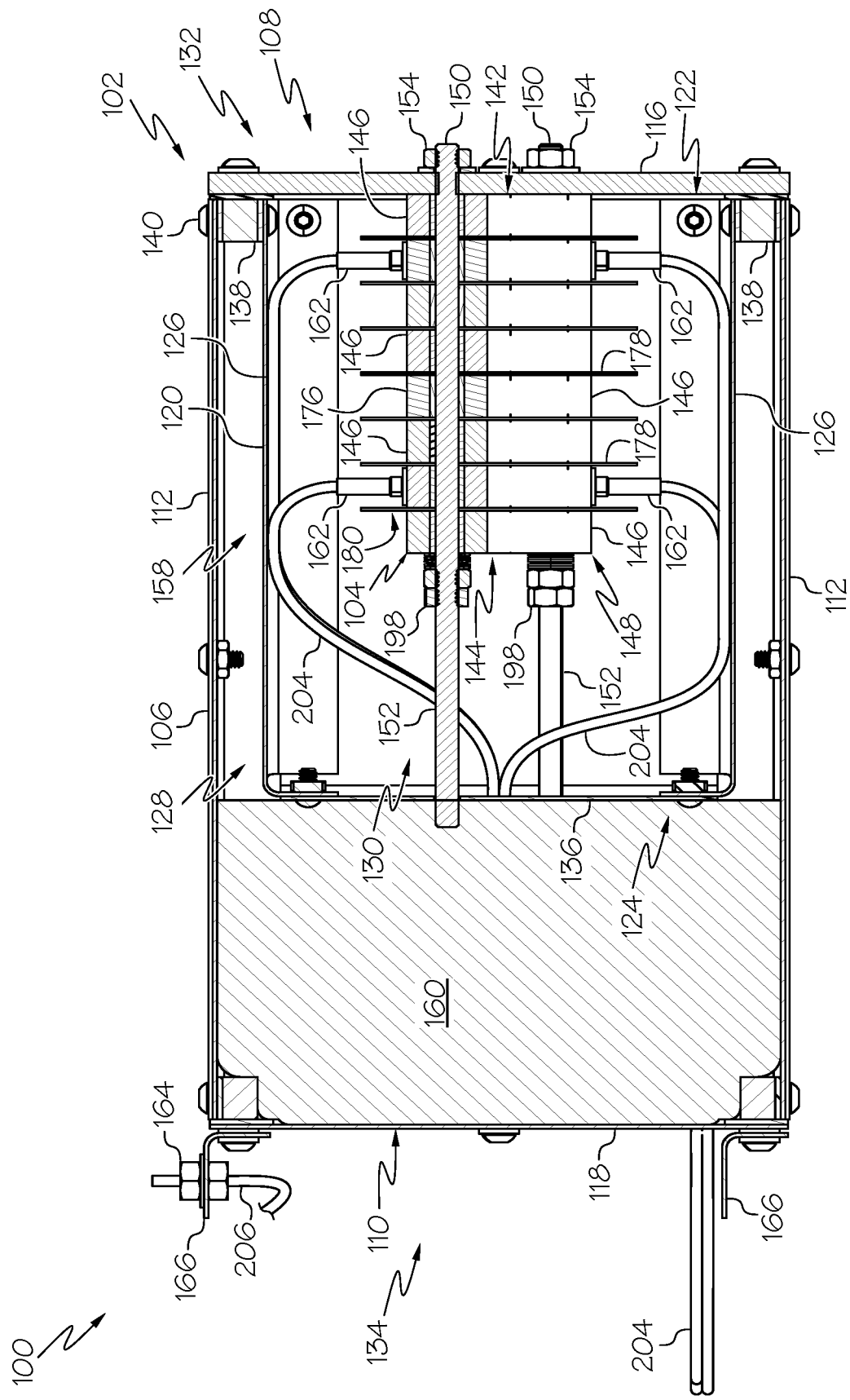
FIG. 2 is a schematic side elevation view, in partial longitudinal cross-section, of another example of the disclosed apparatus.
Figure 3:
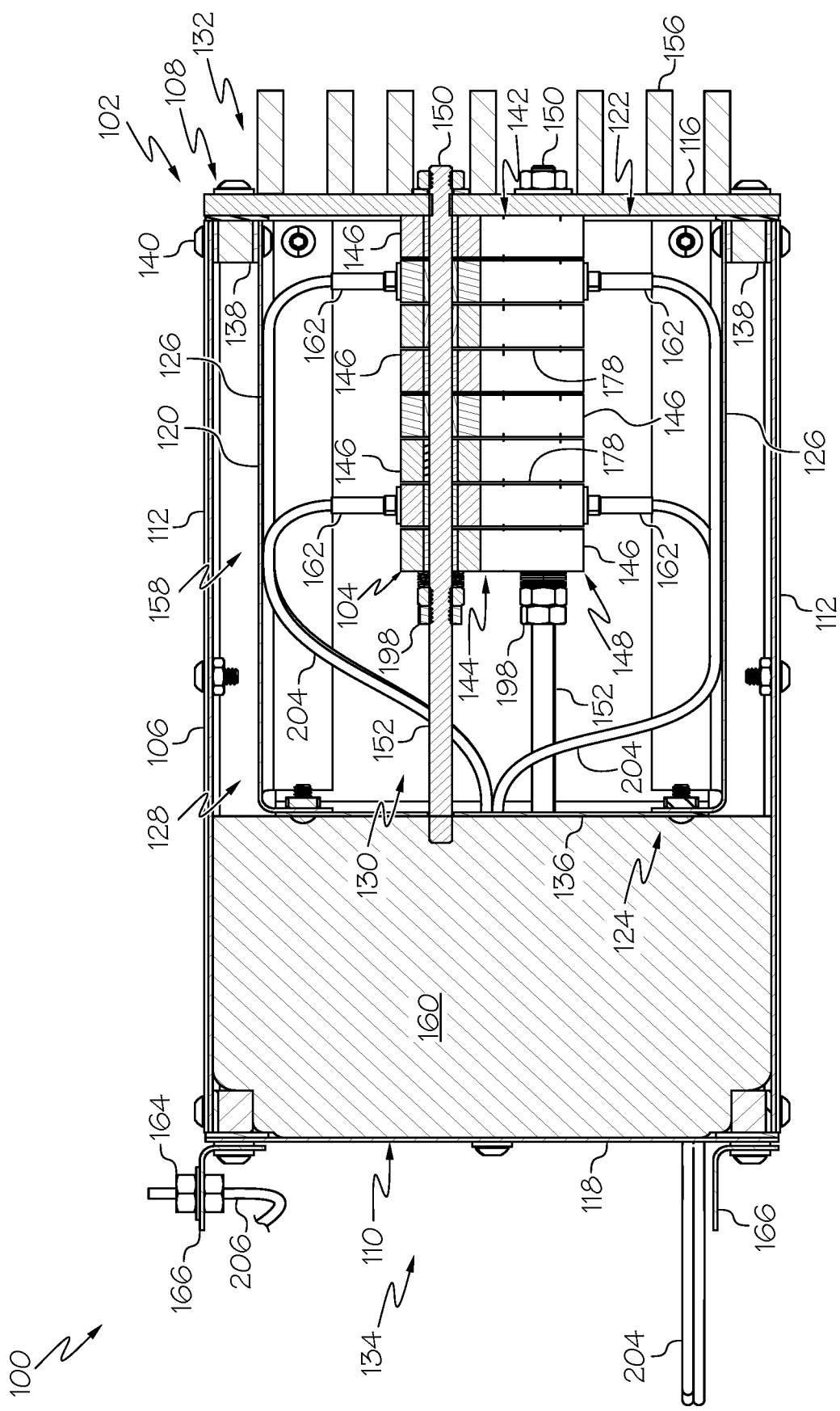
FIG. 3 is a schematic side elevation view, in partial longitudinal cross-section, of another example of the disclosed apparatus.
Figure 4:
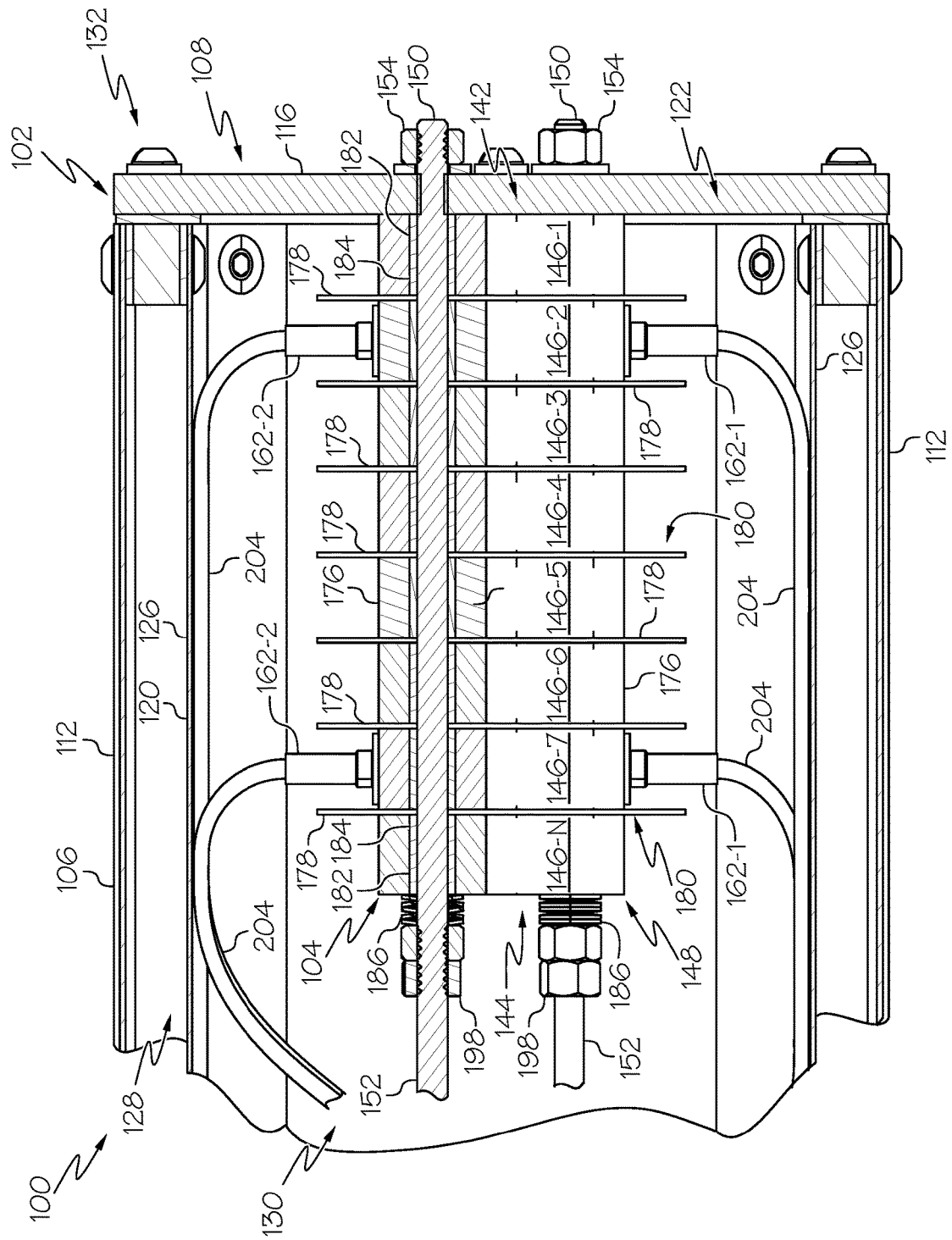
FIG. 4 is a schematic, fragmentary side elevation view, in partial longitudinal cross-section, of another example of the disclosed apparatus.
Figure 7:
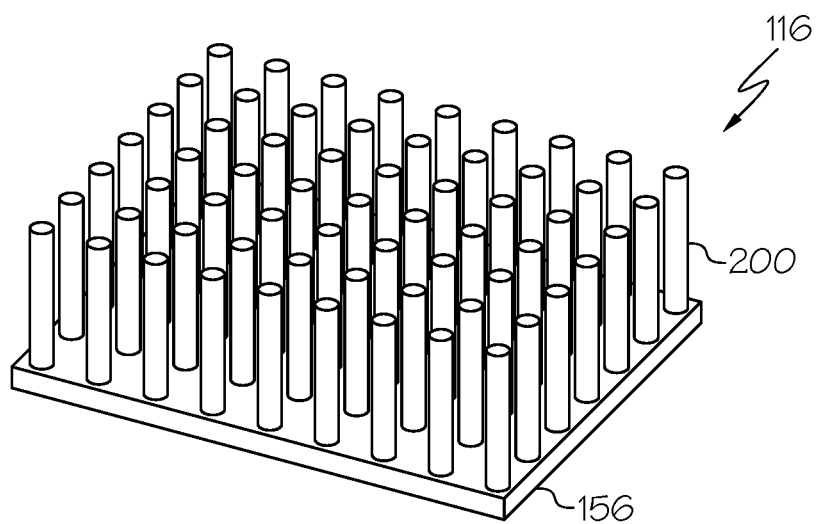
FIG. 7 is a schematic side perspective view on an example of a heat sink of the disclosed apparatus.

Referring to FIGS. 2-4, in an example, the stack 148 (e.g., of the thermally conductive plates 146 or of the thermally conductive plates 146 and the insulating layers 178) is connected to the outer enclosure 106. As an example, at least one fastener 150 (two fasteners 150 are illustrated as an example) connects the stack 148 to the outer enclosure 106 and in contact with the leading end faceplate 116 of the outer enclosure 106. The fastener 150 clamps the thermally conductive plates 146 or, optionally, the thermally conductive plates 146 and insulating layers 178, together in the stacked configuration. The fastener 150 also connects the leading-most one of the thermally conductive plates 146 of the stack 148 to, and in physical contact with, the inner surface of the leading end faceplate 116 of the outer enclosure 106. FIGS. 2, 3 and 7 illustrate a portion of the temperature emulation assembly 104 (e.g., the stack 148 of thermally conductive plates 146 and, optionally, insulator layers 178) in cross-section to more clearly depict an example fastener 150 used to clamp the stack 148 together and connect the stack 148 to the outer enclosure 106.

As an example, the fastener 150 is a rod 152 having an external thread disposed along at least a portion of its length (e.g., a threaded rod). The rod 152 extends through the stack 148 of the thermally conductive plates 146 and the leading end faceplate 116 of the outer enclosure 106. A nut 154 is connected to a leading end of the rod 152 on the outside of the leading end faceplate 116. Another nut 198 is connected to the rod 152 at the lagging end 144 of the stack 148.

As an example, and as best illustrated in FIGS. 2 and 3, a lagging end of the rod 152 may be connected to the lagging end faceplate 136 of the inner enclosure 120. Securing the lagging end of the rod 152 to the lagging end faceplate 136 further supports and maintains the position of the stack 148 relative to the enclosure assembly 102 and inhibits movement of the stack 148, for example, during the thermal curing process. Alternatively, as another example (not illustrated), the lagging end of the rod 152 may terminate proximate to the lagging end 144 of the stack 148.

In other examples, the apparatus 100 may include one or more different mechanisms or devices configured to fasten, clamp or otherwise secure the thermally conductive plates 146 and, optionally, the insulator layers 178 together in the stacked configuration and position the stack 148 within the enclosure assembly 102 in contact with the leading end faceplate 116 and spaced away from the sidewalls of the enclosure assembly 102.

Figure 5:
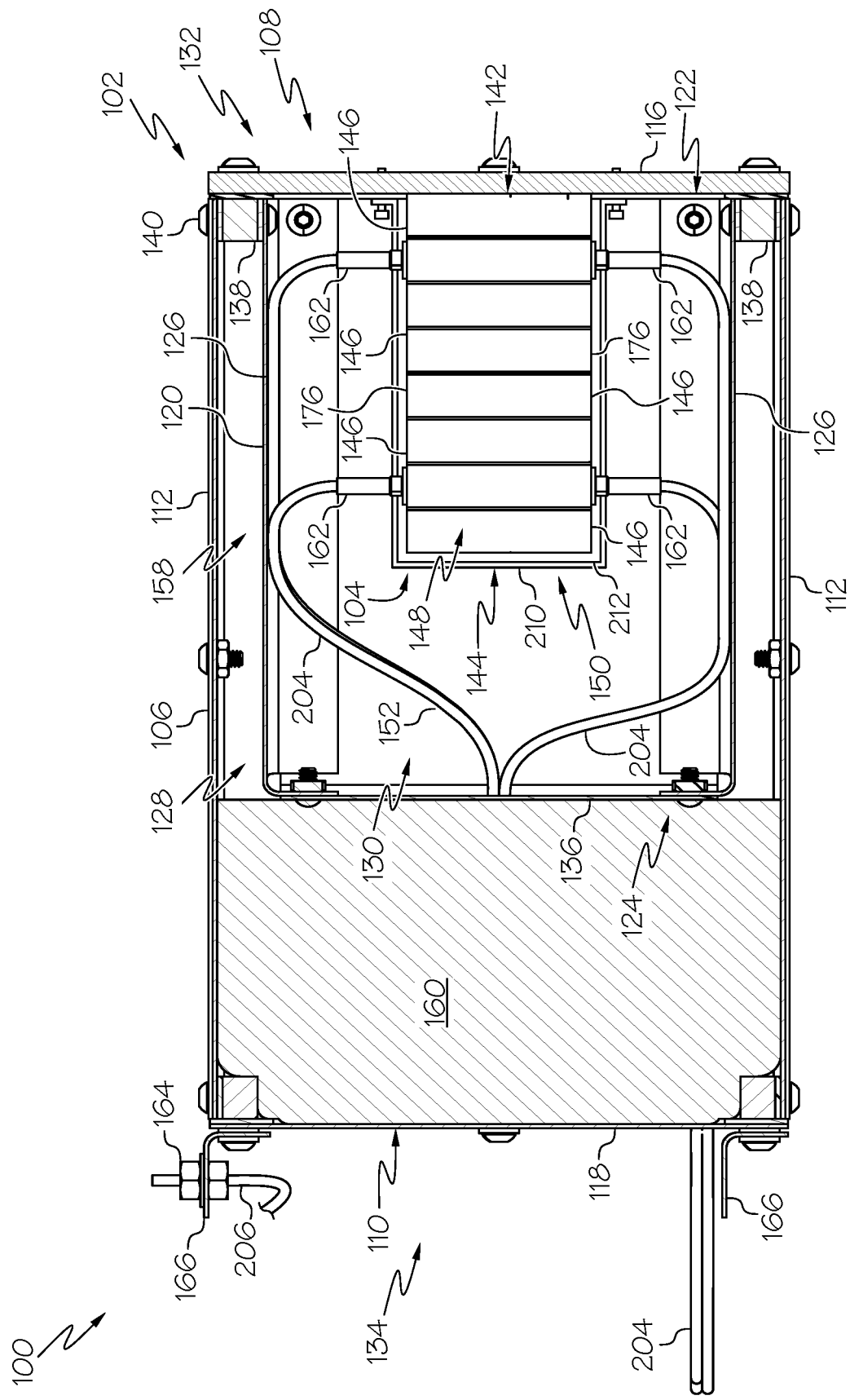
FIG. 5 is a schematic side elevation view, in partial longitudinal cross-section, of another example of the disclosed apparatus.

FIG. 5 is schematic illustration of an example of the disclosed apparatus 100. In FIG. 5, the enclosure assembly 102 is shown in longitudinal cross-section. In an example, the fastener 150 may include a bracket 210 configured to captivate the stack 148 and be connected to the leading end faceplate 116 of the outer enclosure 106. The bracket 210 maintains the plurality of thermally conductive plates 146 or, optionally, the plurality of thermally conductive plates 146 and the plurality of insulating layers 178, in the stacked configuration with the leading-most one of the thermally conductive plates 146 in contact with the leading end faceplate 116 of the outer enclosure 106. As an example, the bracket 210 may have a shape that conforms to the shape of the stack 148 and be configured to fit around the stack 148. A leading end of the bracket 210 is connected (e.g., fastened) to the leading end faceplate 116 of the outer enclosure 106 to hold the stack 148 in position.

In this example, a layer of insulation 212 is positioned between the bracket 210 and the sides 176 of the thermally conductive plates 146 of the stack 148. The insulation 212 inhibits the transfer of heat from the bracket 210 to the stack 148 via conduction.

Figure 6:
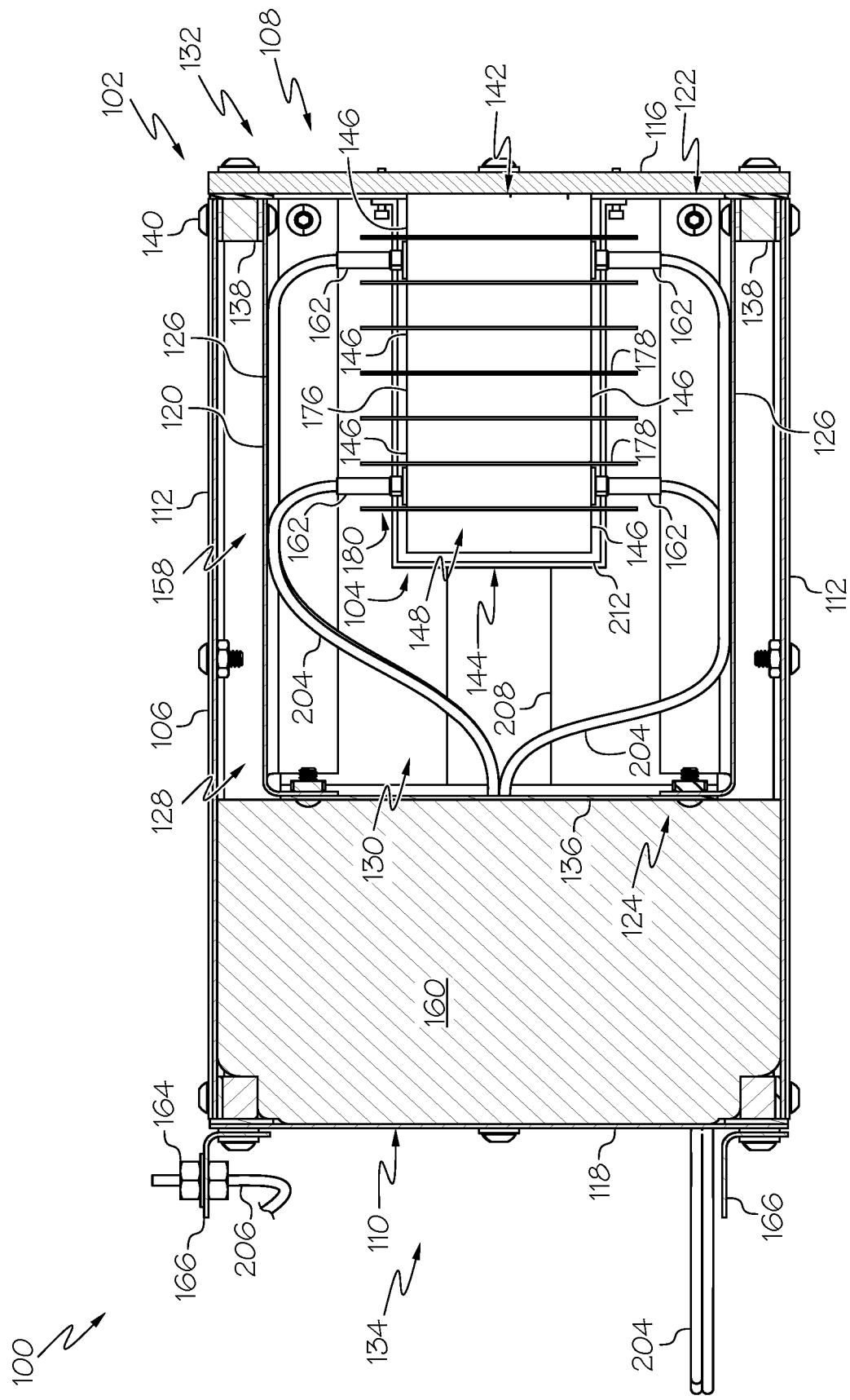
FIG. 6 is a schematic side elevation view, in partial longitudinal cross-section, of another example of the disclosed apparatus.

FIG. 6 is schematic illustration of an example of the disclosed apparatus 100. In FIG. 6, the enclosure assembly 102 is shown in longitudinal cross-section. In an example, the stack 148 (e.g., of the thermally conductive plates 146 or of the thermally conductive plates 146 and the insulating layers 178) is fit within the outer enclosure 106 with the leading end 142 of the stack 148 in contact with the leading end faceplate 116 of the outer enclosure 106 and the lagging end 144 of the stack 148 spaced away from the lagging end faceplate 136 of the inner enclosure 120. As an example, a spacer 208 presses the stack 148 against the inner surface of the leading end faceplate 116 to maintain the plurality of thermally conductive plates 146 or, optionally, the plurality of thermally conductive plates 146 and the plurality of insulating layers 178, in the stacked configuration with the leading-most one of the thermally conductive plates 146 in contact with the leading end faceplate 116 of the outer enclosure 106. As an example, the spacer 208 is positioned between the lagging end faceplate 136 of the inner enclosure 120 and the lagging end 144 of the stack 148. As an example, one end of the spacer 208 is in contact with (e.g., connected to) an inner surface of the lagging end faceplate 136 of the inner enclosure 120 and an opposite end of the spacer 208 is in contact with (e.g., connected to) the lagging-most one of the thermally conductive plates 146 of the stack 148.

In an example, the spacer 208 is a rigid member that is dimensioned to provide an interference fit between the between the lagging end faceplate 136 of the inner enclosure 120 and the lagging end 144 of the stack 148 to compress the stack 148 against the leading end faceplate 116 of the outer enclosure 106 and locking the stack 148 into place. In another example, the spacer 208 is a spring member located between the between the lagging end faceplate 136 of the inner enclosure 120 and the lagging end 144 of the stack 148 to bias the stack 148 against the leading end faceplate 116 of the outer enclosure 106 and locking the stack 148 into place.

In yet another example (not illustrated), the stack 148 of the thermally conductive plates 146 or, optionally, the thermally conductive plates 146 and the insulating layers 178 may be adhesively bonded together. The leading-most one of the thermally conductive plates 146 may also be adhesively bonded to the inner surface of the leading end faceplate 116 of the outer enclosure 106. As an example, the stack 148 may be adhesively bonded together and to the leading end faceplate 116 of the outer enclosure 106 using a high-temperature adhesive or high-temperature tape.

Referring to FIGS. 2-6, in an example, the leading end faceplate 116 is made from a thermally conductive (thermal conducting) material to promote the conductive transfer of heat through the leading end faceplate 116 to the stack 148. As an example, the leading end faceplate 116 may be made from a material with a thermal diffustivity greater than about $10 \times 10^{-6}$ m$^2$/s, such as greater than about $50 \times 10^{-6}$ m$^2$/s. As examples, the leading end faceplate 116 may be made from aluminum, aluminum alloy, copper, copper alloy, steel, steel alloy (e.g., stainless steel) and other thermally conductive metals and metal alloys, such as nickel-iron alloy (e.g., Invar). As another example, the leading end faceplate 116 may be made from thermally conductive composites. The particular configuration of the leading end faceplate 116 (e.g., the thickness and/or material) may be tailored to achieve a prescribed rate of conductive heat transfer through the leading end faceplate 116 to the stack 148 of the thermally conductive plates 146.

In an example, and as illustrated in FIG. 3, the leading end faceplate 116 is, or includes, a heat sink 156. As an example, the heat sink 156 may be integrated to the leading end faceplate 116 (e.g., the leading end faceplate 116 is the heat sink 156). As another example, the heat sink 156 may be physically coupled to an outside surface of leading end faceplate 116 such that heat is transferred conductively from the heat sink 156 to the leading end faceplate 116. For the sake of clarity, it should be noted that the heat sink 156 has been added in the example illustrated in FIG. 3 and that the example illustrated in FIG. 1 does not show the heat sink 156.

Figure 8:
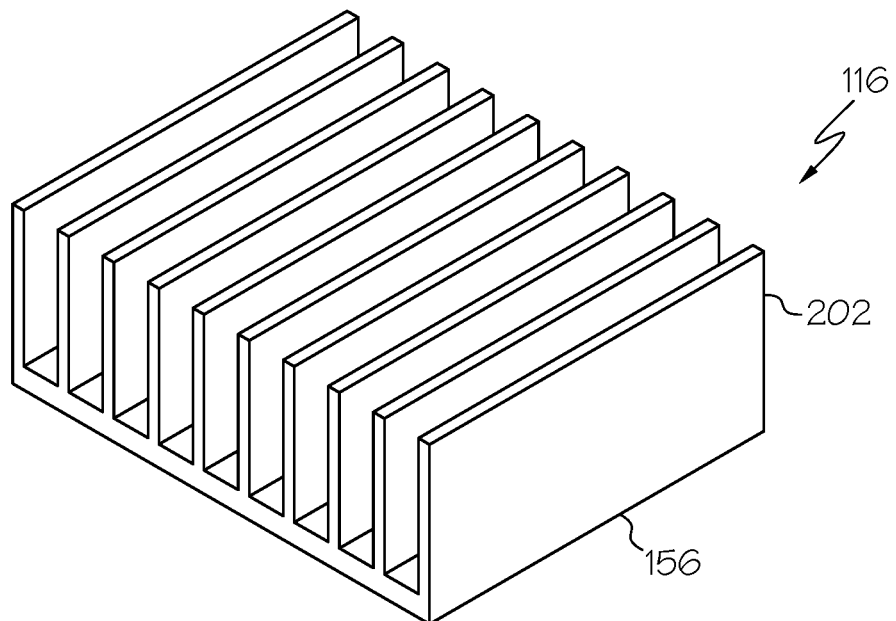
FIG. 8 is a schematic side perspective view on another example of the heat sink of the disclosed apparatus.

Referring to FIGS. 3, 7 and 8, the heat sink 156 may be configured or designed to maximize its surface area in contact with the heated gas (e.g., air) within the thermal curing system (e.g., autoclave or oven). As an example, and as best illustrated in FIG. 7, the heat sink 156 may include an arrangement of pins 200. The pins 200 may have various dimensions and/or shapes (e.g., profile shapes, cross-sectional shapes, etc.). As another example, and as best illustrated in FIG. 8, the heat sink 156 may include an arrangement of fins 202. The fins 202 may have various dimensions and/or shapes (e.g., cross-sectional shapes, profile shapes, etc.). As examples, the fins 202 may be straight, flared, curved and the like. The particular structural configuration or design of the heat sink 156 (e.g., the size, shape, number, layout, etc. of the pins 200, fins 202 or combination of pins 200 and fins 202) may be tailored to achieve a prescribed rate of conductive heat transfer from the heat sink 156 to the leading end faceplate 116 and from the leading end faceplate 116 to the stack 148.

Referring again to FIGS. 2-6, in an example implementation, during use of the apparatus 100 to emulate temperature during a thermal cure cycle, heat is transferred from the heat source of the thermal curing system and/or the gas within the thermal curing system to the outer enclosure 106 via at least one of conduction, convection and radiation. Heat is then conductively transferred through the leading end faceplate 116 (e.g., the heat sink 156) of the outer enclosure 106 to the leading end 142 of the stack 148 of thermally conductive plates 146. Heat is then conductively transferred through the stack 148 of the thermally conductive plates 146 from the leading end 142 of the stack 148 to the lagging end 144 of the stack 148 (e.g., from one of the thermally conductive plates 146 to an adjacent one of the thermally conductive plates 146).

In an example, the sidewalls 112 of the outer enclosure 106 are made from a thermally insulative (thermal insulating) material to inhibit the conductive transfer of heat through the sidewalls 112 to the inner enclosure 120. In an example, the sidewalls 126 of the inner enclosure 120 are made from a thermally insulative (thermal insulating) material to inhibit the conductive transfer of heat through the sidewalls 126 to the stack 148 of the thermally conductive plates 146. The thermally insulative material may include any suitable thermal insulation capable of reducing or inhibiting the transfer of thermal energy. The sidewalls 112 of the outer enclosure 106 and the sidewalls 126 of the inner enclosure 120 may be made from the same thermally insulative material or different thermally insulative materials.

As an example, the sidewalls 112 of the outer enclosure 106 and the sidewalls 126 of the inner enclosure 120 may be made from a material with a thermal diffusivity of less than about $50 \times 10^{-6}$ m$^2$/s, such as less than about $10 \times 10^{-6}$ m$^2$/s. As examples, the sidewalls 112 of the outer enclosure 106 and/or the sidewalls 126 of the inner enclosure 120 may be made from fiberglass and the like. In another example, at least one of the sidewalls 112 of the outer enclosure 106 and/or the sidewalls 126 of the inner enclosure 120 are made from a thermally conductive material During the thermal cure cycle, the enclosure assembly 102 isolates the temperature emulation assembly 104 from the thermal curing system and at least partially insulates the temperature emulation assembly 104 from the effects of convective and/or radiative heat transfer. In an example, enclosure assembly 102 (e.g., the sidewalls 112 of the outer enclosure 106 and the sidewalls 126 of the inner enclosure 120) forms a double-walled barrier around the stack 148 to inhibit the convective transfer of heat from the heated gas within the thermal curing system and/or the radiative transfer of heat from the heat source of the thermal curing system. Isolation of the temperature emulation assembly 104 allows the stack 148 to more accurately represent the thermal profile of the composite structure being emulated during the thermal cure cycle. During the thermal cure cycle, the composite structure being emulated by the apparatus 100 heats primarily via conduction through its thickness. Isolation of the temperature emulation assembly 104 allows the stack 148 to heat primarily via conduction directed from its leading end 142 to its lagging end 144 and inhibits the effects of convection and radiation on the stack 148. As will be described in more detail below, in other examples, the apparatus 100 also includes additional features that inhibit the effects of convection and radiation on the stack 148.

In an example, the outer enclosure 106 includes an insulator 158 disposed within at least a portion of the outer volume 128. The insulator 158 further inhibits heat transfer via conduction, convection and/or radiation from the sidewalls 112 of the outer enclosure 106 to the sidewalls 126 of the inner enclosure 120. As an example, a portion of the outer volume 128 between the sidewalls 112 of the outer enclosure 106 and the sidewalls 126 of the inner enclosure 120 may be filled with the insulator 158.

As an example, the insulator 158 may be air. In this example, movement of air disposed within the portion of the outer volume 128 between the sidewall 112 of the outer enclosure 106 and the sidewall 126 of the inner enclosure 120 is restricted and a pocket of air is formed between the sidewall 112 of the outer enclosure 106 and the sidewall 126 of the inner enclosure 120 that serves as the insulator 158 (e.g., provides a measure of insulation).

As another example, the insulator 158 may be an insulation material, such as a fiber insulation including, but not limited to, cellulose fiber, mineral wool and the like. In this example, the insulation material disposed between the sidewall 112 of the outer enclosure 106 and the sidewall 126 of the inner enclosure 120 serves as the insulator 158 (e.g., provides a greater measure of insulation).

As yet another example, the insulator 158 may be a combination of air and insulation material (e.g., fiber insulation). In this example, the combination of the insulation material with any voids filled with air serves as the insulator 158 (e.g., provides a greater measure of insulation).

In an example, the outer enclosure 106 includes a thermal barrier 160 disposed within at least a portion of the outer volume 128. As an example, the thermal barrier 160 is disposed between the outer enclosure 106 and the inner enclosure 120. As an example, the thermal barrier 160 is positioned between the lagging end faceplate 118 of the outer enclosure 106 and the lagging end faceplate 136 of the inner enclosure 120 and extends between the sidewalls 112 of the outer enclosure 106. The thermal barrier 160 inhibits heat transfer via conduction, convection and/or radiation from the lagging end 134 of the enclosure assembly 102 to the lagging end 144 of the stack 148. As an example, the thermal barrier 160 inhibits heat transfer via conduction, convection and/or radiation from the lagging end faceplate 118 of the outer enclosure 106 to the lagging end faceplate 136 of the inner enclosure 120.

The thermal barrier 160 may be made from any suitable thermally insulative (thermal insulating) material capable of reducing or inhibiting the transfer of thermal energy. As an example, the thermal barrier 160 may be made from a material with a thermal diffusivity of less than about $1 \times 10^{-6}$ $m^2/s$. As examples, the thermal barrier 160 is made from a fiber insulator material (e.g., mineral wool), foam, ceramic, fiberglass and the like. The thermal barrier 160 inhibits heat transfer via conduction, convection and/or radiation initiating at the lagging end 110 of the outer enclosure 106 and directed toward the stack 148 of the thermally conductive plates 146.

Referring to FIGS. 2-6 and 9-11, in an example, the stack 148 is spaced away from the sidewalls 126 of the inner enclosure 120. As best illustrated in FIGS. 9-11, in an example, the inner enclosure 120 includes a thermal disruptor 168. As an example, the thermal disruptor 168 is positioned within the inner volume 130 of the inner enclosure 120 between the sidewalls 126 of the inner enclosure 120 and the stack 148 of the thermally conductive plates 146. As an example, the thermal disruptor 168 may at least partially surround the stack 148. The thermal disruptor 168 obstructs convection (e.g., air circulation) within the inner volume 130 to inhibit heat transfer from the sidewalls 126 of the inner enclosure 120 to the stack 148 via convection. The thermal disruptor 168 also obstructs convection within the inner volume 130 to inhibit heat transfer from the leading end 142 of the stack 148 to the lagging end 144 of the stack 148 via convection.

In an example, the thermal disruptor 168 also inhibits heat transfer from the sidewalls 126 of the inner enclosure 120 to the stack 148 via conduction and/or radiation. As an example, the thermal disruptor 168 may be made from a thermally insulative material. As an example, the thermal disruptor 168 may be made from a material with a thermal diffusivity of less than about $1 \times 10^{-6}$ $m^2/s$. As examples, the thermal disruptor 168 may be made from an insulation material including, but not limited to, fiber insulation (e.g., mineral wool), foam, ceramic, fiberglass, composites and the like. In this example, the insulation material may include a material having voids filled with air or may include a solid material (e.g., having no voids).

In another example, the thermal disruptor 168 may be made from a thermally conductive material, such as metal, composites and the like. In this example, the thermally conductive material may include a material having voids filled with air or may include a solid material (e.g., having no voids).

In an example, the thermal disruptor 168 also inhibits heat transfer from the leading end 142 of the stack 148 to the lagging end 144 of the stack 148 via convection and/or radiation. In this example, the thermal disruptor 168 at least partially isolates one or more thermally conductive plates 146 from one or more adjacent thermally conductive plates 146 and insulates one or more thermally conductive plates 146 from the effects of the exchange of heat transferred from one or more adjacent thermally conductive plates 146 via convection and/or radiation within the inner volume 130 of the inner enclosure 120 between the sidewalls 126 of the inner enclosure 120 and around the stack 148.

Referring to FIG. 9, in an example, the thermal disruptor 168 is made from, or includes, one or more pieces of a fiber mat 170. As an example, pieces or sections of the fiber mat 170 may be positioned at least partially around the stack 148. As an example, the fiber mat 170 may be made from a material with a thermal diffusivity of less than about $1 \times 10^{-6}$ $m^2/s$. As examples, the fiber mat 170 may be mineral wool, foam (e.g., polyurethane foam, polystyrene foam, etc.), fiberglass and the like.

In this example, any voids in the fiber mat 170 may be filled with air. In this example, the fiber mat 170 at least partially isolates one or more thermally conductive plates 146 from one or more adjacent thermally conductive plates 146 and/or the sidewalls 126 of the inner enclosure 120 and insulates one or more thermally conductive plates 146 from the effects of the exchange of heat transferred from one or more adjacent thermally conductive plates 146 and/or the sidewalls 126 of the inner enclosure 120 via convection and/or radiation within the inner volume 130 of the inner enclosure 120 between the sidewalls 126 of the inner enclosure 120 and around the stack 148.

As an example, one or more of the sections of the fiber mat 170 may be in contact with portions of the surface of the stack 148, for example, at least a portion of sides 176 of the thermally conductive plates 146. As an example, the sections of the fiber mat 170 may be connected (e.g., adhered) to the stack 148 (e.g., to the sides 176 of the thermally conductive plates 146). As another example, sections of the fiber mat 170 may be connected (e.g., adhered) to the leading end faceplate 116 of the outer enclosure 106 and extend toward the lagging end 144 (FIGS. 2-6) of the stack 148 around the stack 148. As an example, additional sections of the fiber mat 170 may be stacked and connected (e.g., adhered) to preceding sections of the fiber mat 170 around the stack 148. As yet another example, the inner volume 130 of the inner enclosure 120 may be filled with the fiber mat 170 around the stack 148.

Referring to FIG. 10, in an example, the thermal disruptor 168 is made from, or includes, one or more pieces of a honeycomb structure 172. As an example, pieces or sections of the honeycomb structure 172 may be positioned at least partially around the stack 148. As an example, the honeycomb structure 172 may be made from a metal (e.g., aluminum, steel, titanium, etc.), a metal alloy, a nonmetal, such as an aramid (e.g., Nomex® or Kevlar®), a composite and a thermoplastic and the like.

In this example, the voids in the honeycomb structure 172 may be filled with air. In this example, the honeycomb structure 172 at least partially isolates one or more thermally conductive plates 146 from one or more adjacent thermally conductive plates 146 and/or the sidewalls 126 of the inner enclosure 120 and insulates one or more thermally conductive plates 146 from the effects of the exchange of heat transferred from one or more adjacent thermally conductive plates 146 and/or the sidewalls 126 of the inner enclosure 120 via convection and/or radiation within the inner volume 130 of the inner enclosure 120 between the sidewalls 126 of the inner enclosure 120 and around the stack 148.

As an example, one or more of the sections of the honeycomb structure 172 may be in contact with portions of the surface of the stack 148, for example, at least a portion of the sides 176 of the thermally conductive plates 146. As an example, the sections of the honeycomb structure 172 may be connected (e.g., adhered) to the stack 148 (e.g., to the sides 176 of the thermally conductive plates 146). As another example, sections of the honeycomb structure 172 may be connected (e.g., adhered) to the leading end faceplate 116 of the outer enclosure 106 and extend toward the lagging end 144 (FIGS. 2-6) of the stack 148 around the stack 148. As yet another example, the inner volume 130 of the inner enclosure 120 may be filled with the honeycomb structure 172 around the stack 148.

Referring to FIG. 11, in an example, the thermal disruptor 168 is made from, or includes, one or more baffles 174. As an example, the baffles 174 may be positioned at least partially around the stack 148. As an example, the baffles 174 may be made from a material with a thermal diffustivity of less than about $1 \times 10^{-6}$ m$^2$/s. As examples, the baffles 174 may be made from a metal material (e.g., aluminum, steel, etc.), an aramid material (e.g., Nomex®), a composite material, a thermoplastic material and the like. The baffles 174 may inhibit heat transfer to the stack 148 via conduction, convection and/or radiation.

In this example, the baffles 174 may be solid (e.g., not having any voids) and any voids between adjacent baffles 174 and between the baffles 174 and the stack 148 may be filled with air. In this example, the baffles 174 at least partially isolate one or more thermally conductive plates 146 from one or more adjacent thermally conductive plates 146 and/or the sidewalls 126 of the inner enclosure 120 and insulate one or more thermally conductive plates 146 from the effects of the exchange of heat transferred from one or more adjacent thermally conductive plates 146 and/or the sidewalls 126 of the inner enclosure 120 via convection and/or radiation within the inner volume 130 of the inner enclosure 120 between the sidewalls 126 of the inner enclosure 120 and around the stack 148.

As an example, a plurality of baffles 174 extends from the sidewalls 126 of the inner enclosure 120 toward the stack 148 of the thermally conductive plates 146. As an example, an end of one or more of the plurality of baffles 174 may be positioned proximate to (e.g., at or near) the sides 176 of one or more of the thermally conductive plates 146 of the stack 148. As another example, an end of one or more of the plurality of baffles 174 may be spaced away from the sides 176 of one or more of the thermally conductive plates 146 of the stack 148.

As an example, the plurality of baffles 174 may extend perpendicularly from (e.g., be oriented at a 90-degree angle relative to) the sidewalls 126 of the inner enclosure 120. As another example, the plurality of baffles 174 may extend at a non-zero angle from the sidewalls 126 of the inner enclosure 120. As examples, the plurality of baffles 174 may be oriented at a non-zero angle ranging from approximately 30-degrees to approximately 60-degrees, such as approximately 45-degrees. As an example, one or more of the plurality of baffles 174 may be substantially flat. As another example, one or more of the plurality of baffles 174 may be curved. The configuration of the baffles 174 (e.g., the dimensions, the shape and/or the angular orientation relative to the sidewalls 126) may be designed to increase the surface area of the baffles 174, which in turn increases the disruption of the air circulating around the stack 148.

Referring particularly to FIG. 4, and with reference to FIGS. 2, 3, 5 and 6, in an example, the stack 148 of the thermally conductive plates 146 may include any number of thermally conductive plates 146. As an example, the stack 148 may include N number of thermally conductive plates 146, identified individually as thermally conductive plates 146-1 through 146-N in FIG. 4. In the illustrative examples, the stack 148 includes eight thermally conductive plates 146 (e.g., N=8).

Thus, the stack 148 of thermally conductive plates 146 or, optionally, of thermally conductive plates 146 and insulator layers 178 serve as a thermal mass that represents, or emulates, the composite structure being thermally cured. The temperatures measured for the plurality of thermally conductive plates 146 are used to generate a thermal profile for the stack 148. The thermal profile of the stack 148 is then correlated to a thermal profile generated for the article that is to be emulated by the apparatus 100 (e.g., the composite structure). During an initial thermal cure cycle, the measured temperature extremes (e.g., hottest and coldest temperatures) of article being cured are correlated to the measured temperatures of certain ones of the thermally conductive plates 146. During subsequent thermal cure cycles, the temperatures of those certain ones of the thermally conductive plates 146 are monitored, which represent the hottest and coldest locations on or within the article being emulated (e.g., the composite structure).

The number of thermally conductive plates 146 used to form the stack 148 may depend, for example, upon the type, dimensions and/or materials of the article that is to be emulated by the apparatus 100 (e.g., the composite structure) and/or the particular thermal profile desired. As an example, a greater number of thermally conductive plates 146 may be used to emulate a large and/or thick composite structure. As another example, a lesser number of thermally conductive plates 146 may be used to emulate a small and/or thin composite structure.

The materials used to form the thermally conductive plates 146 may also depend, for example, upon the type, dimensions and/or materials of the article that is to be emulated by the apparatus 100 (e.g., the composite structure) and/or the particular thermal profile desired. The materials used to form the thermally conductive plates 146 need not be the same materials used to form the article that is to be emulated by the apparatus 100.

Referring to FIGS. 2-6, each of the thermally conductive plates 146 of the stack 148 has a thickness. The thickness of the thermally conductive plate 146 may depend, for example, upon the type, dimensions and/or materials of the article that is to be emulated by the apparatus 100 and/or the particular temperature profile desired. As an example, thicker thermally conductive plates 146 may be used to emulate a large and/or thick composite structure. As another example, thinner thermally conductive plates 146 may be used to emulate a small and/or thin composite structure.

As a non-limiting example, the thickness of the thermally conductive plate 146 may range from about 0.0125 inch (0.3 mm) to more than 1 inch (25 mm), such as from about 0.25 inch (6 mm) to about 1 inch (25 mm). In an example, all of the thermally conductive plates 146 may have the same thickness. In another example, at least one of the thermally conductive plates 146 may have a different thickness than at least another one of the thermally conductive plates 146. In yet another example, the thickness of all of the thermally conductive plates 146 may be different.

In an example, each thermally conductive plate 146 may be made from a thermally conductive material. As an example, each thermally conductive plate 146 may be made from a material with a thermal diffustivity of greater than about $10 \times 10^{-6}$ m$^2$/s, such as greater than about $50 \times 10^{-6}$ m$^2$/s. As examples, the thermally conductive plates 146 may be made from a thermally conductive metal (e.g., aluminum, steel and the like) or a thermally conductive metal alloy (e.g., stainless steel, Invar and the like). As another example, the thermally conductive plates 146 may be made from a thermally conductive non-metal (e.g., thermoplastic or composite).

With the plurality of thermally conductive plates 146 secured together in the stacked configuration and secured to the outer enclosure 106 in contact with the leading end faceplate 116 by the fastener 150 (e.g., threaded rod 152 or bracket 210) (FIGS. 2-5) or by the spacer 208 (FIG. 6), the coefficient of thermal expansion of the thermally conductive plates 146 may be of minimal concern when selecting the materials for the thermally conductive plates 146.

In the illustrative examples, the thermally conductive plates 146 are substantially flat such that each thermally conductive plate 146 is in direct physical contact with an adjacent thermally conductive plate 146 for heat to transfer conductively through the stack 148 from the leading end 142 to the lagging end 144. Similarly, in the illustrative examples, the leading end faceplate 116 of the outer enclosure 106 is also substantially flat such that the leading-most end plate 146 is in direct physical contact with the inner surface of the leading end faceplate 116 for heat to transfer conductively through the leading end faceplate 116 to the stack 148.

In another example, the thermally conductive plates 146 may include some degree of curvature (not illustrated). In this example, each thermally conductive plate 146 is configured to be in direct physical contact with an adjacent thermally conductive plate 146 for heat to transfer conductively through the stack 148 from the leading end 142 to the lagging end 144. Similarly, in another example, the leading end faceplate 116 of the outer enclosure 106 may include some degree of curvature such that the leading-most end plate 146 is in direct physical contact with the inner surface of the leading end faceplate 116 for heat to transfer conductively through the leading end faceplate 116 to the stack 148.

Referring to FIG. 4, in an example, a leading end thermally conductive plate 146-1 is in contact with the leading end faceplate 116 of the outer enclosure 106. Heat is conductively transferred from (e.g., through) the leading end faceplate 116 to the leading end thermally conductive plate 146-1. Thus, the leading end thermally conductive plate 146-1 may define the first thermally conductive plate 146 of the stack 148 and represents the entry of heat being transferred to the stack 148. Heat is then conductively transferred from (e.g., through) the leading end thermally conductive plate 146-1 to the next adjacent thermally conductive plate 146-2. Heat is then conductively transferred from (e.g., through) the thermally conductive plate 146-2 to the next adjacent thermally conductive plate 146-3. This successive conductive transfer of heat through the plurality of thermally conductive plates 146 from the leading end 142 to the lagging end 144 continues to a lagging end thermally conductive plate 146-N. The lagging end thermally conductive plate 146-N defines the last thermally conductive plate 146 of the stack 148.

Referring to FIGS. 2-6, in an example, at least one of the thermally conductive plates 146 located proximate to the lagging end 144 of the stack 148 may be a buffer plate. As an example, and as best illustrated in FIG. 4, at least the lagging end thermally conductive plate 146-N serves as a buffer plate. As another example, two or more thermally conductive plates 146 (e.g., thermally conductive plate 146-N and thermally conductive plate 146-7 in FIG. 4) serve as the buffer plates. In this example, the thermally conductive plates 146 located proximate to the lagging end 144 of the stack 148 inhibit conductive heat transfer through the stack 148 entering from the lagging end 144 of the stack 148. In the illustrative examples, only thermally conductive plates 146-1 through 146-7 are used to emulate the article and generate the thermal profile and the thermally conductive plate 146-N is sacrificial to absorb heat.

In an example, the stack 148 may, optionally, also include one or more of the insulator layers 178. As an example, one or more of the thermally conductive plates 146 may be separated from an adjacent thermally conductive plate 146 by the insulator layer 178. In the illustrative examples, each thermally conductive plate 146 is separated from an adjacent thermally conductive plate 146 by the insulator layer 178.

In an example, each insulator layer 178 is made from a thermally insulative material capable of reducing or inhibiting the transfer of thermal energy. As an example, each insulator layer 178 is made from a material with a thermal diffusivity of less than about $10 \times 10^{-6}$ m$^2$/s. As examples, the insulator layers 178 may be made from fiberglass, an aramid (e.g., Kevlar®), ceramic, foam, epoxy and the like.

In an example, the insulator layers 178 control the rate of conductive heat transfer through the stack 148 from the leading end 142 to the lagging end 144. Each of the insulator layers 178 of the stack 148 has a thickness. The thickness of the insulator layers 178 may depend, for example, upon the type, dimensions and/or materials of the article that is to be emulated by the apparatus 100, the desired rate of heat transfer and/or the particular temperature profile desired.

As an example, thicker insulator layers 178 may be used to achieve a slower rate of conductive heat transfer through a portion of or the entire stack 148. As another example, thinner insulator layers 178 may be used to achieve a faster rate of conductive heat transfer through a portion of or the entire stack 148. As an example, when used, the thickness of the insulator layer 178 may range from about 0.008 inch (0.2 mm) to about 1 inch (25 mm) or more, such as from about 0.015 inch (0.3 mm) to about 0.5 inch (12 mm). In an example, all of the insulator layers 178 may have the same thickness. In another example, at least one of the insulator layers 178 may have a different thickness than at least another one of the insulator layers 178. In yet another example, the thickness of all of the insulator layers 178 may be different.

In an example, and as illustrated in FIGS. 2, 4 and 6, a peripheral portion 180 of at least one of the insulator layers 178 extends beyond the perimeter sides 176 of the thermally conductive plates 146. In this example, the insulator layers 178 also inhibit heat transfer from the leading end 142 of the stack 148 to the lagging end 144 of the stack 148 via convection and/or radiation. In this example, the peripheral portion 180 of the insulator layers 178 at least partially isolates one or more thermally conductive plates 146 from one or more adjacent thermally conductive plates 146 and insulates one or more thermally conductive plates 146 from the effects of the exchange of heat transferred from one or more adjacent thermally conductive plates 146 via convection and/or radiation within the inner volume 130 of the inner enclosure 120 and around the stack 148.

In another example, and as illustrated in FIGS. 3 and 5, no portion of any of the insulator layers 178 extends beyond the perimeter sides 176 of the thermally conductive plates 146.

Referring to FIG. 4, in an example, each of the thermally conductive plates 146 includes at least one fastener aperture 182 extending through the thickness of the thermally conductive plate 146. Similarly, when the insulator layers 178 are optionally used, each of the insulator layers 178 includes the at least one fastener aperture 182 extending through the thickness of the insulator layer 178. FIG. 4 illustrates a portion of the temperature emulation assembly 104 (e.g., the stack 148) in cross-section to more clearly depict the fastener 150 used to clamp the stack 148 together connect the stack 148 to the outer enclosure 106. Only the fastener apertures 182 of the leading end thermally conductive plate 146-1 and the lagging end thermally conductive plate 146-N are explicitly identified in FIG. 4. The fastener 150 (e.g., the rod 152) extends through the aligned fastener apertures 182 of the thermally conductive plates 146 and, optionally, the insulator layers 178.

Figure 12:
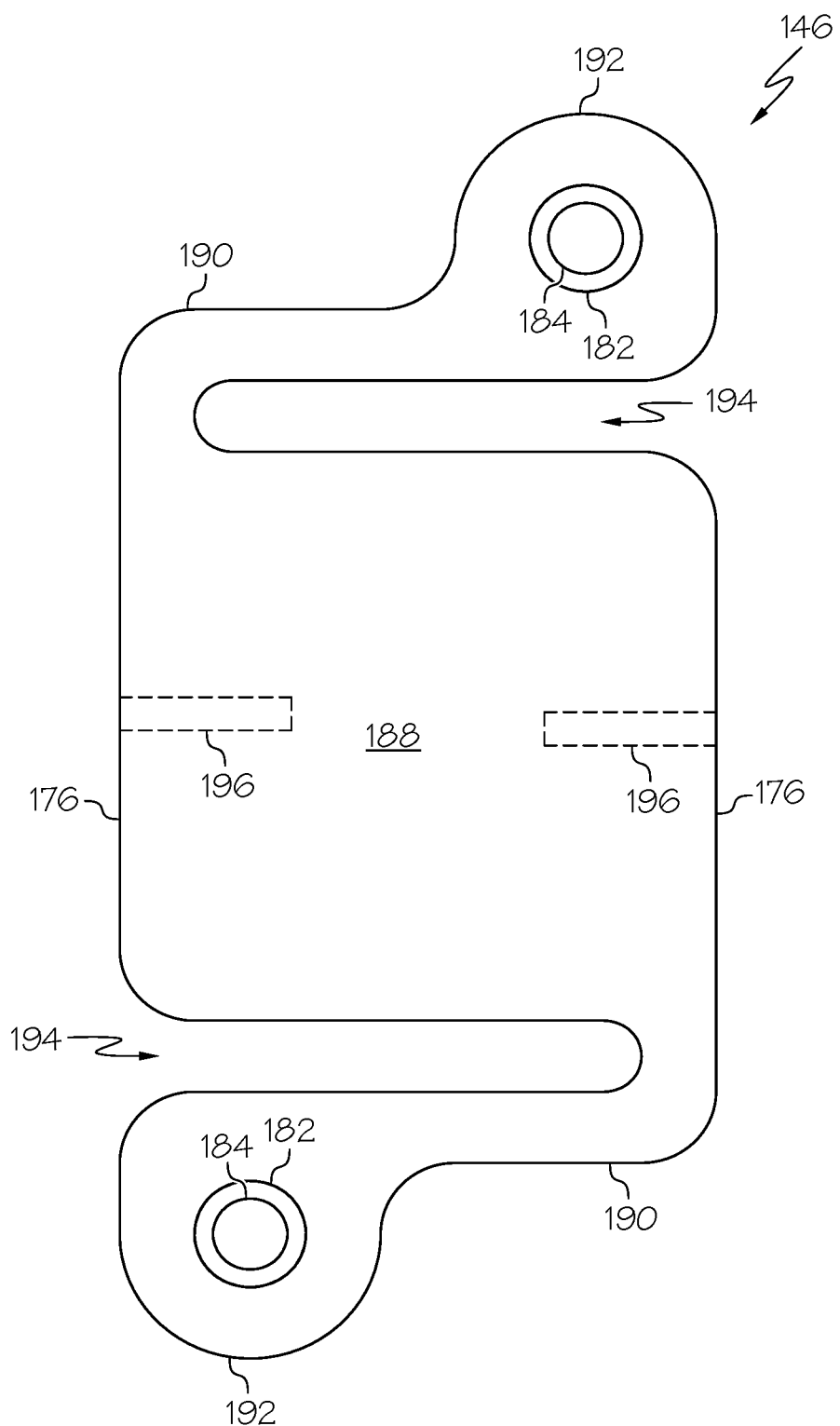
FIG. 12 is a schematic plan view of an example of a thermally conductive plate of the disclosed apparatus.

Referring to FIGS. 4 and 12, in an example, the fastener apertures 182 of the thermally conductive plates 146 are lined with an insulating liner 184. Only the insulating liner 184 of the leading end thermally conductive plate 146-1 and the lagging end thermally conductive plate 146-N are explicitly identified in FIG. 4. As an example, the insulating liner 184 is made from an insulative material applied to the inner surface of the thermally conductive plate 146 defining the fastener aperture 182. The insulating liner 184 may be made from any suitable thermal insulation capable of reducing or inhibiting the transfer of thermal energy including, for example, ceramic, aramid, fiberglass, epoxy and the like. The insulating liner 184 inhibits heat transfer from the fastener 150 (e.g., the rod 152) to the thermally conductive plates 146 via conduction.

Referring particularly to FIG. 4, and with reference to FIGS. 2, 3, 5 and 6, in an example, the fastener 150 also includes at least one washer 186 positioned between the nut 154 and the lagging end thermally conductive plate 146-N. The at least one washer 186 distributes a force applied to ends of the stack 148 from the nut 154. As an example, the washer 186 may be made from a thermally conductive material, such as metal. As another example, the washer 186 may be made from a thermally insulative material, such as ceramic, fiberglass, epoxy and the like. In this example, the washer 186 inhibits heat transfer from the fastener 150 (e.g., the nut 154 and/or the rod 152) to the lagging end thermally conductive plate 146-N and other thermally conductive plates 146 proximate to the lagging end 144 of the stack 148. A plurality of washers 186 may also space the nut 154 away from the lagging end thermally conductive plate 146-N of the stack 148.

Referring to FIG. 12, in an example, the thermally conductive plate 146 includes a main body 188. The body 188 of the thermally conductive plate 146 provides the mass for the conductive transfer of heat through the stack 148 (FIGS. 2-6).

In the illustrative example, the thermally conductive plate 146 also includes at least one arm 190 extending outwardly from the body 188. A connector 192 is disposed at an end of the arm 190. The connector 192 includes the fastener aperture 182 with the insulating liner 184. In the illustrative example, the thermally conductive plate 146 includes two arms 190, each having an end connector 192 for installation of two fasteners 150 (e.g., threaded rods 152) (FIGS. 2-4). In this example, threaded rods 152 are used to maintain the thermally conductive plates 146 or, optionally, the thermally conductive plates 146 and the insulator layers 178 in the stacked configuration and the stack 148 in contact with the leading end faceplate 116 of the outer enclosure 106.

In an example, the arm 190 is spaced away from the body 188, defining a gap 194 therebetween. The arm 190, and the associated connector 192, space the fastener 150 (FIGS. 2-4) away from the body 188 to isolate the body 188 from the fastener 150 and inhibit heat transfer from the fastener 150 to the thermally conductive plate 146 via conduction.

Figure 13:
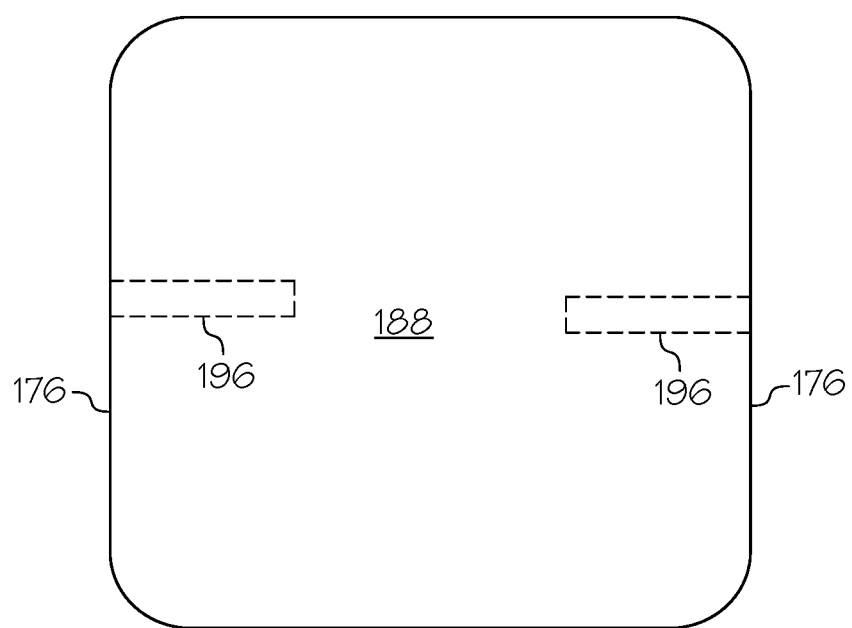
FIG. 13 is a schematic plan view of another example of the thermally conductive plate of the disclosed apparatus.

Referring to FIG. 13, in another example, the thermally conductive plate 146 only includes the body 188 that provides the mass for the conductive transfer of heat through the stack 148 (FIGS. 5 and 6). In this example, the arms 190 are not needed because the bracket 210 (FIG. 5) or the spacer 208 (FIG. 6) are used to maintain the thermally conductive plates 146 or, optionally, the thermally conductive plates 146 and the insulator layers 178 in the stacked configuration and the stack 148 in contact with the leading end faceplate 116 of the outer enclosure 106.

Referring to FIGS. 12 and 13, in an example, the thermally conductive plate 146 also includes at least one channel 196 extending inwardly from a perimeter side (or edge) 176 of the body 188 for insertion, or otherwise coupling, of the temperature sensor 162 (FIGS. 2-6) to the thermally conductive plate 146. As an example, the temperature sensor 162 may be inserted into an associated channel 196. As an example, the channel 196 may extend proximate to a center of the body 188. In the illustrative examples, the thermally conductive plate 146 includes two opposing channels 196 for connection of the two redundant temperature sensors 162. Those skilled in the art will recognize that the shape, dimensions and/or location of the channels 196 may vary (e.g., may depend on the shape and configuration of the temperature sensor 162). As an example, the body 188 of the thermally conduct plate 146 may also include a connecting feature (not shown) configured to allow a bracket of the temperature sensor 162 to clip onto the side 176 of the thermally conductive plate 146.

The temperature emulation assembly 104 (e.g., the stack 148 of the thermally conductive plates 146 and, optionally, the insulator layers 178) may have various other features and/or configurations. Similarly, the thermally conductive plates 146 may have various other features and/or configurations. For example, a temperature emulator such as described in U.S. Pat. No. 9,068,894, titled "Device for Emulating Temperature of a Composite Structure Through a Thermal Cure Cycle," which issued on Jun. 30, 2015, and U.S. Pat. No. 9,304,048, titled "Device for Emulating Temperature of an Exothermic Composite Structure Through a Thermal Cure Cycle," which issued on Apr. 5, 2016, the entire contents of which are incorporated herein by reference, may be examples of the temperature emulation assembly 104 and/or the thermally conductive plates 146 of the disclosed apparatus 100.

Figure 14:
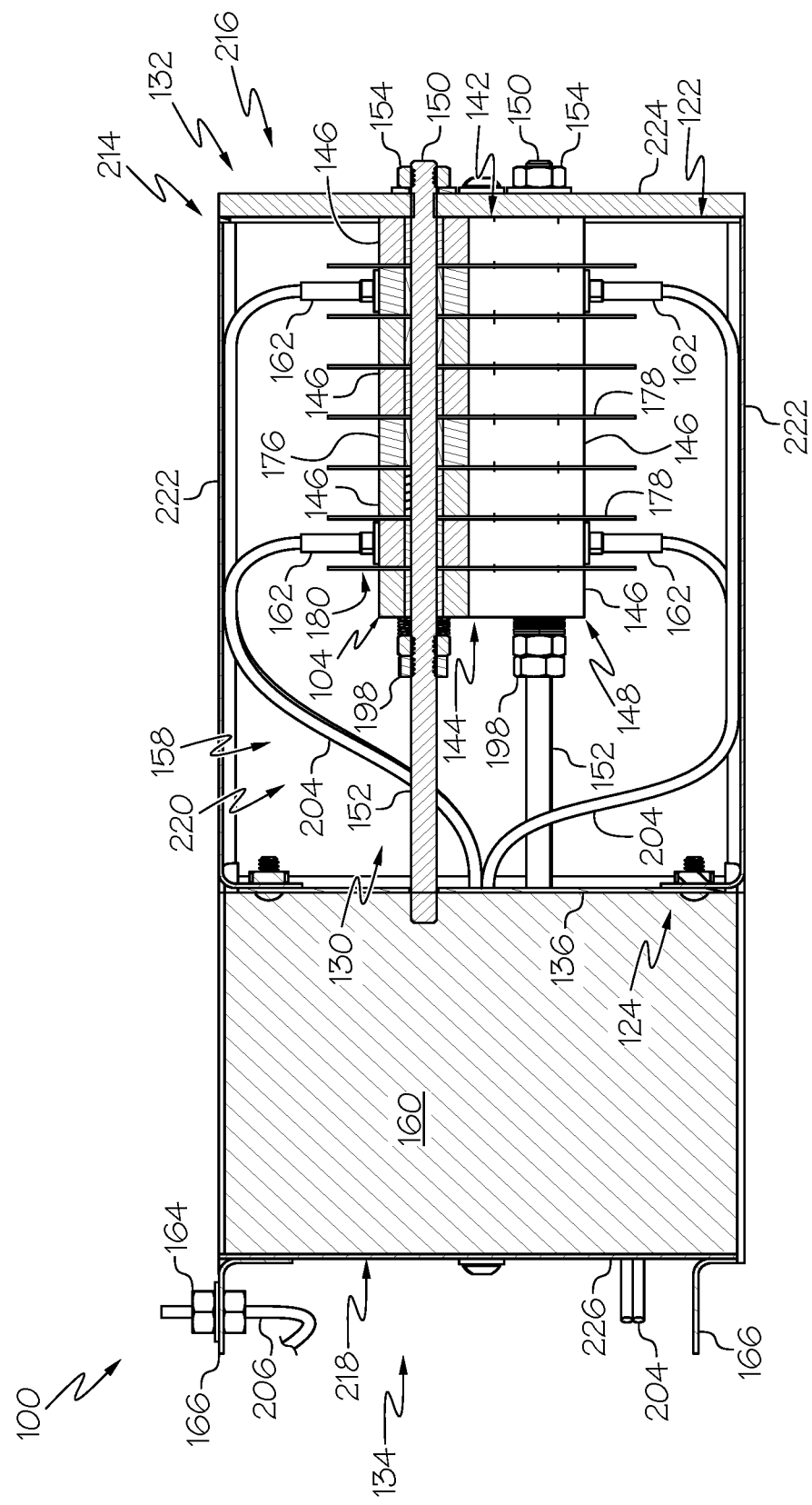
FIG. 14 is a schematic side elevation view, in partial longitudinal cross-section, of another example of the disclosed apparatus.
Figure 15:
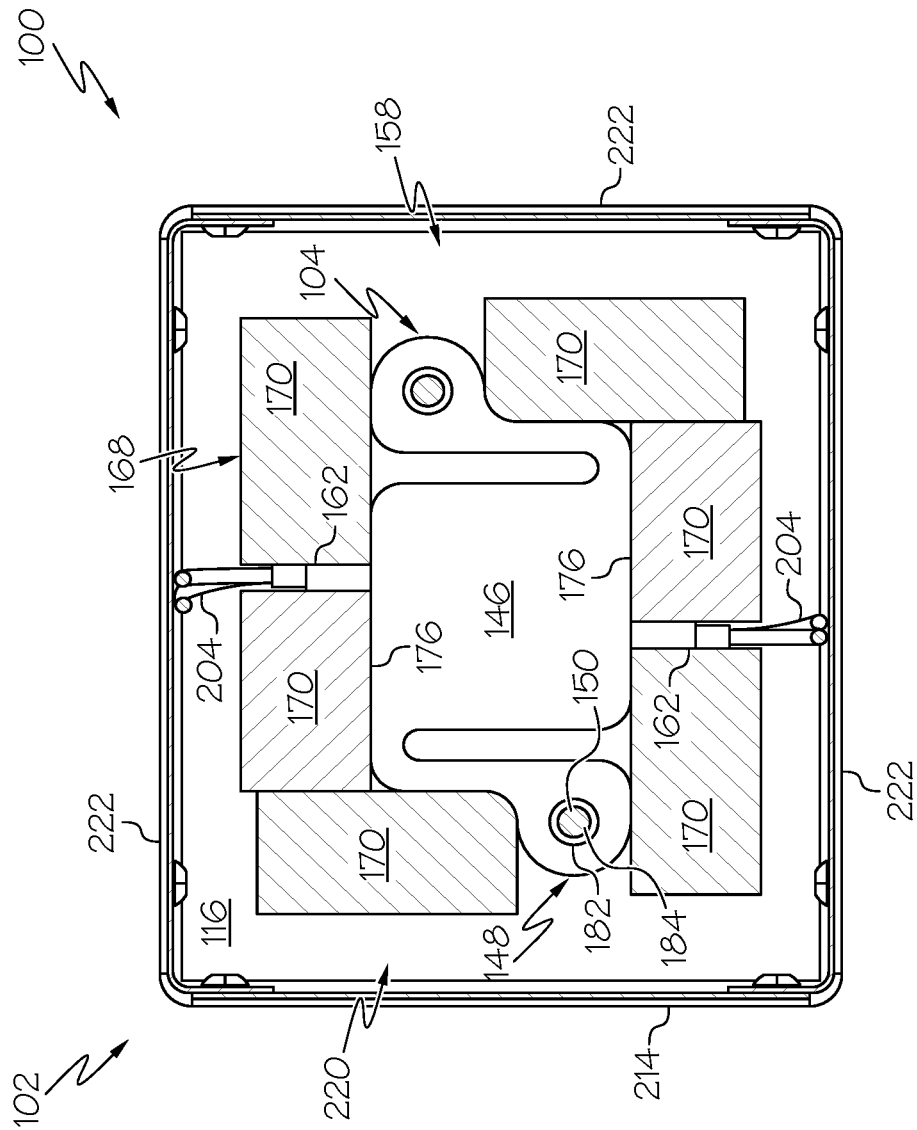
FIG. 15 is a schematic end elevation view, in partial transverse cross-section, of another example of the disclosed apparatus.

FIGS. 14 and 15 are schematic illustrations of another example of the disclosed apparatus 100. In FIG. 14, the enclosure assembly 102 is shown in longitudinal cross-section and a portion of the temperature emulation assembly 104 (e.g., the stack 148) is shown in longitudinal cross-section to more clearly depict the fastener 150 used to secure the stack 148 together and connect the stack 148 to the enclosure assembly 102. In FIG. 15, the enclosure assembly 102 is shown in transverse cross-section.

Referring to FIGS. 14 and 15, in an example, the enclosure assembly 102 includes a single enclosure 214. The enclosure 214 includes an enclosure leading (e.g., first) end 216 (also referred to as an enclosure-leading end) and a lagging (e.g., second) end 218 (also referred to as an enclosure-lagging end) longitudinally opposed to the leading end 216. The enclosure 214 defines an inner volume 220.

In an example, the enclosure 214 is a six-sided enclosure having a rectangular shape in longitudinal cross-section (e.g., FIG. 14) and a rectangular shape in transverse cross-section (e.g., FIG. 15). As an example, the enclosure 214 includes a plurality of (e.g., four) sidewalls 222 (also referred to as enclosure-sidewalls). The enclosure 214 also includes a leading end faceplate 224 (also referred to as an enclosure-leading end faceplate) connected to a leading end of the sidewalls 222 and enclosing the leading end 216 of the enclosure 214. The enclosure 214 also includes a lagging end faceplate 226 (also referred to as an enclosure-lagging end faceplate) connected to a lagging end of the sidewalls 222 and enclosing the lagging end 218 of the enclosure 214. In other examples, the enclosure 214 may have various other structural configurations and/or geometric shapes (e.g., square, circular, etc.) in cross-section, without limitation.

Referring to FIG. 14, in an example, the temperature emulation assembly 104 is mounted to the enclosure 214 within the inner volume 220. The temperature emulation assembly 104 includes the plurality of thermally conductive plates 146 or, optionally, the plurality of thermally conductive plates 146 and the plurality of insulator layers 178 arranged in the stack 148.

In an example, the temperature emulation assembly 104 is disposed toward the leading end 132 of the enclosure assembly 102. As an example, the stack 148 is disposed toward the leading end 216 of the enclosure 214. As an example, the leading end 142 of the stack 148 is positioned proximate to (e.g., at or near) the leading end 216 of the enclosure 214 and the lagging end 144 of the stack 148 is spaced away from the lagging end 218 of the enclosure 214. As an example, one of the thermally conductive plates 146 located at the leading end 142 of the stack 148 (e.g., a leading-most thermally conductive plate 146) may abut an inner surface of the leading end faceplate 224 of the enclosure 214.

In an example, the leading end faceplate 224 of the enclosure 214 is made from a thermally conductive (thermal conducting) material to promote the conductive transfer of heat through the leading end faceplate 224 to the stack 148.

In an example, the leading end faceplate 224 is, or includes, the heat sink 156 as illustrated and described in FIGS. 3, 7 and 8.

In an example, the sidewalls 222 of the enclosure 214 are made from a thermally insulative (thermal insulating) material to inhibit the conductive transfer of heat from the sidewalls 222 to the stack 148.

In an example, and as illustrated in FIG. 14, the stack 148 may be fixed in position by one or more threaded rod 152 as illustrated and described in FIGS. 2-4. In another example, the stack 148 may be fixed in position by one or more brackets 210 as illustrated and described in FIG. 5. In another example, the stack 148 may be fixed in position by one or more spacers 208 as illustrated and described in FIG. 6.

During the thermal cure cycle, the enclosure assembly 102 isolates the temperature emulation assembly 104 from the thermal curing system and at least partially insulates the temperature emulation assembly 104 from the effects of convective and/or radiative heat transfer. In an example, enclosure assembly 102 (e.g., the sidewalls 222 of the enclosure 214) forms a single-walled barrier around the stack 148 to inhibit the convective transfer of heat from the heated gas within the thermal curing system and/or the radiative transfer of heat from the heat source of the thermal curing system. Isolation of the temperature emulation assembly 104 allows the stack 148 to more accurately represent the thermal profile of the composite structure being emulated during the thermal cure cycle. During the thermal cure cycle, the composite structure being emulated by the apparatus 100 heats primarily via conduction through its thickness. Isolation of the temperature emulation assembly 104 allows the stack 148 to heat primarily via conduction directed from its leading end 142 to its lagging end 144 and inhibits the effects of convection and radiation on the stack 148. As will be described in more detail below, in other examples, the apparatus 100 also includes additional features that inhibit the effects of convection and radiation on the stack 148.

In an example, the enclosure 214 includes the insulator 158 disposed within at least a portion of the volume 220. The insulator 158 further inhibits heat transfer via conduction, convection and/or radiation from the sidewalls 222 of the enclosure 214 to stack 148. As an example, a portion of the volume 220 between the sidewalls 222 of the enclosure 214 and the stack 148 may be filled with the insulator 158.

In an example, the enclosure 214 includes the thermal barrier 160 disposed within at least a portion of the volume 220. As an example, the thermal barrier 160 is disposed between the enclosure 214 and the stack 148. As an example, the thermal barrier 160 is positioned between the lagging end faceplate 226 of the enclosure 214 and the lagging end 144 of the stack 148 and extends between the sidewalls 222 of the enclosure 214.

Referring to FIG. 15, in an example, the stack 148 is spaced away from the sidewalls 222 of the enclosure 214. In an example, the enclosure 214 includes the thermal disruptor 168. As an example, the thermal disruptor 168 is positioned within the volume 220 of the enclosure 214 between the sidewalls 222 of the enclosure 214 and the stack 148. As an example, the thermal disruptor 168 may at least partially surround the stack 148. The thermal disruptor 168 obstructs convection (e.g., air circulation) within the volume 220 to inhibit heat transfer from the sidewalls 222 of the enclosure 214 to the stack 148 via convection. The thermal disruptor 168 also obstructs convection within the volume 220 to inhibit heat transfer from the leading end 142 of the stack 148 to the lagging end 144 of the stack 148 via convection. The thermal disruptor 168 also inhibits heat transfer from the sidewalls 222 of the enclosure 214 to the stack 148 via conduction and/or radiation.

In an example, and as illustrated in FIG. 15, the thermal disruptor 168 is made from, or includes, one or more pieces of a fiber mat 170 as illustrated and described in FIG. 9. In another example, the thermal disruptor 168 is made from, or includes, one or more pieces of a honeycomb structure 172 as illustrated and described in FIG. 10. In another example, the thermal disruptor 168 is made from, or includes, one or more baffles 174 as illustrated and described in FIG. 11.

Accordingly, the disclosed apparatus 100 is used to emulate a composite structure during the thermal cure cycle. During the thermal cure cycle, the temperatures measured for selected ones of the thermally conductive plates 146 are used as representative temperatures of selected locations on or within the composite structure. The measured temperatures of certain ones of the thermally conductive plates 146 represent the hottest and coldest temperatures at different locations on or within the composite structure. The measured temperatures may then be used as inputs for controlling the heat source of the thermal curing system to regulate the temperature of the composite structure during the thermal cure cycle.

The apparatus 100 accommodates multiple channels using different ones of the thermally conductive plates 146 so that both the hottest (e.g., leading) temperature and the coldest (e.g., lagging) temperature of the composite structure can be emulated by the temperature emulation assembly 104. The temperature emulation assembly 104 serves as a thermal mass formed from the plurality of thermally conductive plates 146. Adjacent ones of the thermally conductive plates 146 may be spaced apart by a predetermined distance and separated by the insulator layer 178. The alternating series of thermally conductive plates 146 and insulator layers 178 creates a stable and well-controlled temperature gradient in a step-wise pattern through the temperature emulation assembly 104 from the leading end 142 to the lagging end 144.

The temperature emulation assembly 104 is insulated from the surroundings within the thermal curing system on all sides but one by the enclosure assembly 102. The enclosure assembly 102 permits heat to transfer to the temperature emulation assembly 104 only via conduction through the leading end 132 of the enclosure assembly 102 (e.g., through the leading end faceplate 116 or the leading end faceplate 224). Thus, the enclosure assembly 102 controls the transfer of heat to the temperature emulation assembly 104 in a predictable way.

Beneficially, the disclosed apparatus 100 emulates both the most leading (e.g., hottest) and the most lagging (e.g., coldest) temperatures of the composite structure. The apparatus 100 emulates the temperature from an exothermic behavior of curing materials. The temperature emulation assembly 104 of the apparatus 100 is a solid-state and robust mechanism having no moving parts or electronics. The thermally conductive plates 146 of the temperature emulation assembly 104 may be built up from inexpensive and easily assembled plate members. The plate members may be formed (e.g., water-jet cut) to have various different dimensions, shapes and/or patterns formed into the plate material. The apparatus 100 may be calibrated with the use of a thermal model and by arranging the thermally conductive plates 146 in a pre-determined stacked arrangement such that the thermal response of the apparatus 100 substantially matches the thermal response of the composite structure. The apparatus 100 does not need to be in contact with the composite structure or the associated tooling or fixtures to emulate the composite structure. Further, use of the apparatus 100 eliminates the requirement to place temperature sensors in contact with the composite structure and/or tooling (e.g., the article being emulated). The apparatus 100 is compact in design having a relatively small in size and light in weight.

Figure 16:
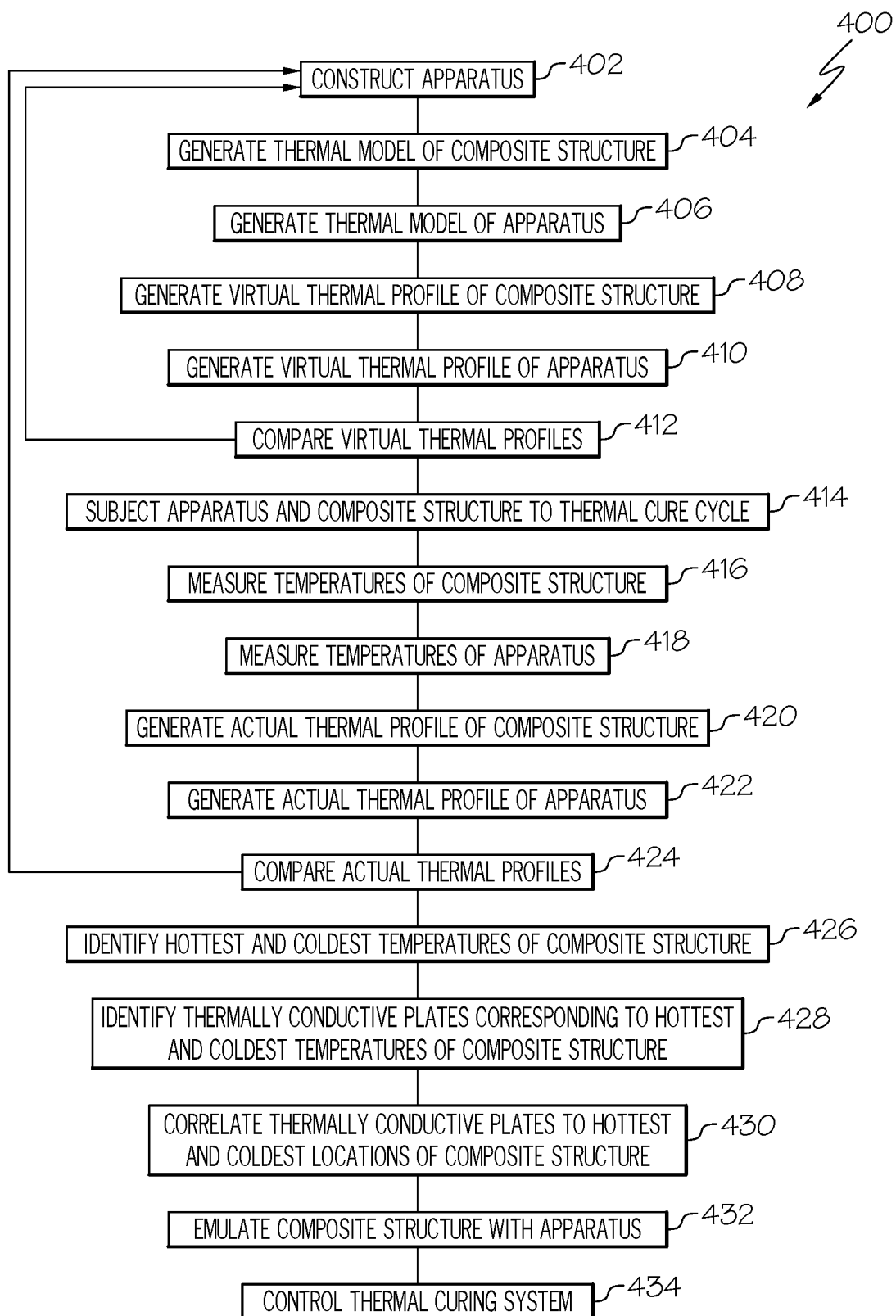
FIG. 16 is a flow diagram of an example of the disclosed method for emulating an article.

Referring to FIG. 16, a flow diagram 400 depicts an example method for emulating an article during a heating cycle, for example, for emulating temperature and/or a thermal inertia gradient of the composite structure during the thermal cure cycle using the disclosed apparatus 100 shown in FIGS. 1-15. At block 402, the method begins by constructing the apparatus 100 by arranging the enclosure assembly 102 and the temperature emulation assembly 104. The apparatus 100 is initially constructed in an attempt to achieve a thermal response of the apparatus 100 that replicates a thermal response of a specific composite structure. This initial construction may be based at least in part on the knowledge and experience of one skilled in the art in view of the materials and dimensions of the specific composite structure and the materials and arrangement of the enclosure assembly 102 and the temperature emulation assembly 104. The method continues with calibration of the apparatus 100.

At block 404, a thermal model of the composite structure is generated. At block 406, a thermal model of the apparatus 100 is generated based on the initial arrangement of the enclosure assembly 102 and the temperature emulation assembly 104.

At block 408, a virtual thermal profile of the composite structure is generated based on the thermal model of the composite structure. At block 410, a virtual thermal profile of the apparatus 100 is generated based on the thermal model of the apparatus 100.

At block 412, the virtual thermal profile of the apparatus 100 is compared to the virtual thermal profile of the composite structure. When the virtual thermal profile of the apparatus 100 substantially matches the virtual thermal profile of the composite structure, the method may continue. When the virtual thermal profile of the apparatus 100 does not substantially match the virtual thermal profile of the composite structure, the apparatus 100 is reconstructed by rearranging the enclosure assembly 102 and the temperature emulation assembly 104 in another attempt to achieve the thermal response of the apparatus 100 that replicates the thermal response of the specific composite structure. A final configuration of the temperature emulation assembly 104 (e.g., the total number, thicknesses, and stacked configuration of the thermally conductive plates 146 and/or insulator layers 178) may be determined that has a thermal profile that closely matches the thermal profile of the composite structure.

At block 414, when the virtual thermal profile of the apparatus 100 substantially matches the virtual thermal profile of the composite structure, both the composite structure and the apparatus 100 are subjected to the thermal cure cycle. At block 416, temperatures at different locations one or within the composite structure are measure, for example, by a plurality of temperature sensors coupled to the composite structure, during the thermal cure cycle. At block 418, temperatures of each of the thermally conductive plates 146 of the temperature emulation assembly 104 are measure by the plurality of temperature sensors 162 coupled to the stack 148 during the thermal cure cycle.

At block 420, an actual thermal profile of the composite structure is generated based on the measured temperatures of the composite structure. At block 422, an actual thermal profile of the apparatus 100 is generated based on the measured temperatures of the apparatus 100.

At block 424, the actual thermal profile of the apparatus 100 is compared to the actual thermal profile of the composite structure. When the actual thermal profile of the apparatus 100 substantially matches the actual thermal profile of the composite structure, the method may continue. When the actual thermal profile of the apparatus 100 does not substantially match the actual thermal profile of the composite structure, the apparatus 100 is modified by rearranging the enclosure assembly 102 and the temperature emulation assembly 104 in another attempt to achieve the thermal response of the apparatus 100 that replicates the thermal response of the specific composite structure.

At block 426, when the actual thermal profile of the apparatus 100 substantially matches the actual thermal profile of the composite structure, the hottest and coldest measured temperatures at different locations of the composite structure are identified. At block 428, certain ones of the thermally conductive plates 146 of the temperature emulation assembly 104 having measured temperatures matching the hottest and coldest measured temperatures of the composite structure are identified. At block 430, those certain ones of the thermally conductive plates 146 are correlated to correspond to the hottest and coldest locations of the composite structure. As an example, a first temperature of the thermal profile of the temperature emulation assembly 104 is matched with the hottest temperature of the thermal profile of the composite structure. A second temperature of the thermal profile of the temperature emulation assembly 104 is matched with the coldest temperature of the thermal profile of the composite structure. The two location of the temperature emulation assembly 104 (e.g., the two selected thermally conductive plates 146) are selected to correspond to the first temperature and the second temperature of the thermal profile of the temperature emulation assembly 104.

At block 432, the apparatus 100 is then used to emulate additional composite structures having the same material and dimensional configuration during subsequent thermal cure cycles. During thermal curing of a subsequent composite structure, the apparatus 100 is subjected to the thermal cure cycle along with the composite structure. Temperature sensors 162 are coupled to the identified thermally conductive plates 146 having previously measured temperatures matching the hottest and coldest measured temperatures of the composite structure.

At block 434, the temperature outputs measured for the temperature emulation assembly 104 are used as inputs for control of the heat source of the thermal curing system to regulate the temperature of the composite structure during the thermal cure cycle.

Figure 17:
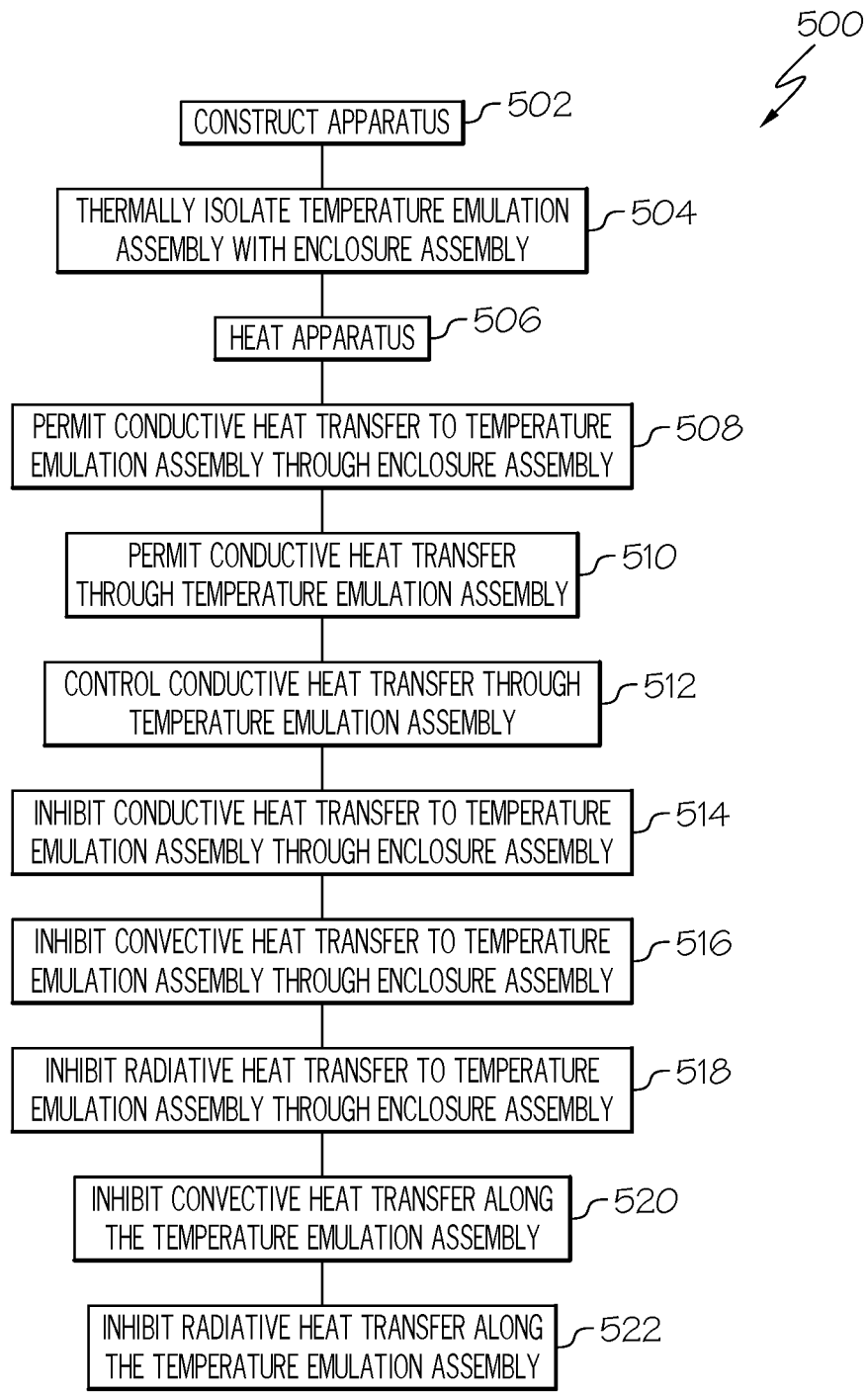
FIG. 17 is a flow diagram of an example of the disclosed method for controlling heat transfer.

Referring to FIG. 17, flow diagram 500 depicts an example method for controlling heat transfer during emulation of an article subjected to a heating cycle, for example, for controlling heat transfer to the temperature emulation assembly 104 of the disclosed apparatus 100 emulating the composite structure during the thermal cure cycle. At block 502, the method begins by constructing the apparatus 100 by arranging the enclosure assembly 102 and the temperature emulation assembly 104 to achieve the thermal response of the apparatus 100 that replicates the thermal response of the composite structure, for example, as described above and illustrated in FIG. 16. At block 504, the temperature emulation assembly 104 is thermally isolated from the surroundings by the enclosure assembly 102. At block 506, the apparatus 100 is heated, for example, within the thermal curing system during a thermal cure cycle.

At block 508, conductive heat transfer to the temperature emulation assembly 104 of the apparatus 100 is permitted through enclosure assembly 102 in only one direction. As an example, conductive heat transfer to the temperature emulation assembly 104 is permitted through the leading end 132 of the enclosure assembly 102 of apparatus 100 to a leading end 142 of the temperature emulation assembly 104 of the apparatus 100. As an example, heat is transferred via conduction, convection and/or radiation from the surrounding gas within the thermal curing system to the leading end faceplate 116 (or the leading end faceplate 224). Heat is then transferred via conduction from the leading end faceplate 116 (or the leading end faceplate 224) to the leading-most one of the thermally conductive plates 146 in contact with the leading end faceplate 116 (or the leading end faceplate 224).

As shown at block 510, conductive heat transfer through the temperature emulation assembly 104 is permitted. As an example, conductive heat transfer is permitted from the leading end 142 of the temperature emulation assembly 104 to the lagging end 144 of the temperature emulation assembly 104. As an example, heat is progressively transferred via conduction from the leading-most one of the thermally conductive plates 146 through intermediate ones of the thermally conductive plates 146 to the lagging-most one of the thermally conductive plates 146.

As shown at block 512, conductive heat transfer through the temperature emulation assembly 104 is controlled. As an example, conductive heat transfer is controlled from the leading end 142 of the temperature emulation assembly 104 to the lagging end 144 of the temperature emulation assembly 104. As an example, the insulator layers 178 positioned between adjacent ones of the thermally conductive plates 146 control the conductive heat transfer from the leading end 142 to the lagging end 144 of the stack 148. As another example, the thickness of the thermally conductive plates 146 controls the conductive heat transfer from the leading end 142 to the lagging end 144 of the stack 148. As another example, the material selection of the thermally conductive plates 146 controls the conductive heat transfer from the leading end 142 to the lagging end 144 of the stack 148.

At block 514, conductive heat transfer from the enclosure assembly 102 to the temperature emulation assembly 104 is inhibited. As an example, the insulator 158 of the enclosure assembly 102 inhibits heat transfer via conduction from the enclosure assembly 102 to the stack 148 of the temperature emulation assembly 104. As another example, the thermal barrier 160 of the enclosure assembly 102 inhibits heat transfer via conduction from the enclosure assembly 102 to the stack 148 of the temperature emulation assembly 104.

At block 516, convective heat transfer from the enclosure assembly 102 to the temperature emulation assembly 104 is inhibited. As an example, the insulator 158 of the enclosure assembly 102 inhibits heat transfer via convection from the enclosure assembly 102 to the stack 148 of the temperature emulation assembly 104. As another example, the thermal barrier 160 of the enclosure assembly 102 inhibits heat transfer via convection from the enclosure assembly 102 to the stack 148 of the temperature emulation assembly 104. As another example, the thermal disruptor 168 of the enclosure assembly 102 inhibits heat transfer via convection from the enclosure assembly 102 to the stack 148 of the temperature emulation assembly 104.

At block 518, radiative heat transfer from the enclosure assembly 102 to the temperature emulation assembly 104 is inhibited. As an example, the insulator 158 of the enclosure assembly 102 inhibits heat transfer via radiation from the enclosure assembly 102 to the stack 148 of the temperature emulation assembly 104. As another example, the thermal barrier 160 of the enclosure assembly 102 inhibits heat transfer via radiation from the enclosure assembly 102 to the stack 148 of the temperature emulation assembly 104. As another example, the thermal disruptor 168 of the enclosure assembly 102 inhibits heat transfer via radiation from the enclosure assembly 102 to the stack 148 of the temperature emulation assembly 104.

At block 520, convective heat transfer along the temperature emulation assembly 104 is inhibited. As an example, convective heat transfer from the leading end 142 of the temperature emulation assembly 104 to the lagging end 144 of the temperature emulation assembly 104 is inhibited. As an example, the thermal disruptor 168 of the enclosure assembly 102 inhibits heat transfer via convection from the leading end 142 to the lagging end 144 of the stack 148 of the temperature emulation assembly 104. As another example, the peripheral portions 180 of the insulator layers 178 of the stack 148 inhibit heat transfer via convection from the leading end 142 to the lagging end 144 of the stack 148 of the temperature emulation assembly 104.

At block 522, radiative heat transfer along the temperature emulation assembly 104 is inhibited. As an example, radiative heat transfer from the leading end 142 of the temperature emulation assembly 104 to the lagging end 144 of the temperature emulation assembly 104 is inhibited. As an example, the thermal disruptor 168 of the enclosure assembly 102 inhibits heat transfer via radiation from the leading end 142 to the lagging end 144 of the stack 148 of the temperature emulation assembly 104. As another example, the peripheral portions 180 of the insulator layers 178 of the stack 148 inhibit heat transfer via radiation from the leading end 142 to the lagging end 144 of the stack 148 of the temperature emulation assembly 104.

Figure 18:
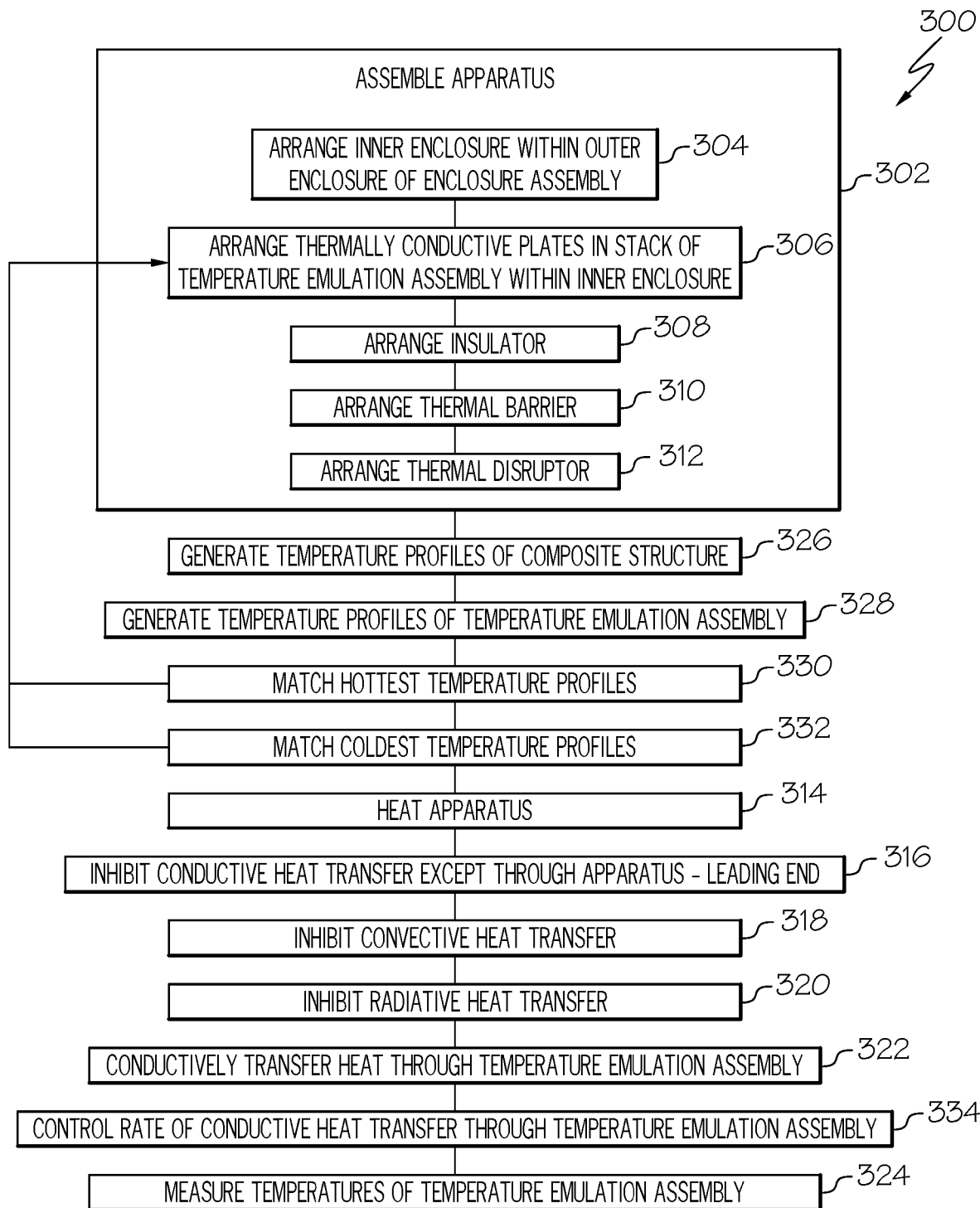
FIG. 18 is a flow diagram of another example of the disclosed method for emulating an article.

Referring to FIG. 18, flow diagram 300 depicts an example method for emulating an article, for example, for emulating temperature and/or a thermal inertia gradient of the composite structure during the thermal cure cycle utilizing the disclosed apparatus 100 shown in FIGS. 1-15. At block 302, the method begins with assembling the apparatus 100. The apparatus 100 includes the enclosure assembly 102 and the temperature emulation assembly 104 positioned within the enclosure assembly 102. The assembly step (block 302) may be an example of the construction steps (blocks 402 and 502) described and illustrated in FIGS. 16 and 17.

In an example, assembling the apparatus 100 (block 302) includes arranging enclosure assembly 102 and arranging the temperature emulation assembly 104. As an example, arranging the enclosure assembly 102 includes arranging the inner enclosure 120 within the outer enclosure 106, as shown at block 304. At block 306, arranging the temperature emulation assembly 104 includes arranging the plurality of thermally conductive plates 146 in the stack 148 within the inner enclosure 120.

At block 308, the insulator 158 is arranged between the outer enclosure-sidewalls 112 of the outer enclosure 106 and the inner enclosure-sidewalls 126 of the inner enclosure 120. At block 310, the thermal barrier 160 is arranged between the outer enclosure-lagging end faceplate 118 of the outer enclosure 106 and the inner enclosure-lagging end faceplate 136 of the inner enclosure 120. At block 312, the thermal disruptor 168 is arranged between the inner enclosure-sidewalls 126 of the inner enclosure 120 and the stack 148 of the plurality of thermally conductive plates 146.

As shown at block 314, the apparatus 100 is heated within the thermal curing system. As shown at block 316, during heating, conductive heat transfer to the temperature emulation assembly 104 is inhibited along any conductive heat transfer path except through the apparatus-leading end 132 of the apparatus 100. As shown at block 318, during heating, convective heat transfer to the temperature emulation assembly 104 is inhibited along any convective heat transfer path. As shown at block 320, during heating, radiative heat transfer to the temperature emulation assembly 104 is inhibited along any radiative heat transfer path. As shown at block 322, during heating, heat is conductively transferred through the temperature emulation assembly 104 from the temperature emulation assembly-leading end 142, positioned proximate to the apparatus-leading end 132, to the temperature emulation assembly-lagging end 144.

As shown at block 324, temperatures of two location of the temperature emulation assembly 104 are measured with at least two temperature sensors 162 throughout the thermal cure cycle. As an example, the temperatures of two selected thermally conductive plates 146 are measured. The two selected thermally conductive plates 146 represent the temperature extremes (e.g., the hottest and coldest locations) of the composite structure being emulated by the apparatus 100. In such a manner, using the measured temperatures of the apparatus 100 to represent the temperatures of the composite structure takes the place of using measured temperatures of the forming tool to represent the temperatures of the composite structure.

Optionally, gas temperatures may also be measured with at least one gas temperature sensor 164 throughout the thermal cure cycle. As an example, the gas temperatures may represent the hottest temperature of the composite structure. Depending upon the configuration of the composite structure (e.g., a very thin composite structure), the composite structure may heat very close to the gas temperature.

The temperatures of the temperature emulation assembly 104 and, optionally, the gas temperatures of the gas within the thermal curing system, are used by the controller of the thermal curing system to control the gas temperature within the thermal curing system during the thermal cure cycle. As an example, the temperature control settings of the thermal cure system may be adjusted in response to the temperature inputs provided by the apparatus 100.

Prior to emulating the temperature of composite structure with the apparatus 100, the apparatus 100 is calibrated to properly represent the temperature profile of the composite structure. As shown at block 326, a plurality of temperature profiles of the composite structure at a plurality of locations of the composite structure is generated. As an example, the plurality of temperature profiles is generated by thermally coupling a plurality of temperature sensors to the plurality of locations of the composite structure, subjecting the composite structure to the thermal cure cycle and measuring the temperatures of the plurality of locations throughout the thermal cure cycle.

As shown at block 328, a plurality of temperature profiles of the temperature emulation assembly 104 at a plurality of locations of the temperature emulation assembly 104 and, optionally, of the gas within the thermal curing system, is generated. As an example, the plurality of temperature profiles is generated by thermally coupling at least one temperature sensor to each one of the plurality of thermally conductive plates 146, representing the plurality of locations of the temperature emulation assembly 104, subjecting the apparatus 100 to the thermal cure cycle along with the composite structure and measuring the temperatures of the plurality of thermally conductive plates 146 throughout the thermal cure cycle.

As shown at block 330, a hottest temperature profile of the temperature emulation assembly 104 representing a hottest location of the temperature emulation assembly 104 (e.g., the hottest thermally conductive plate 146) is matched with a hottest temperature profile of the composite structure representing a hottest location of the composite structure. As shown at block 332, a coldest temperature profile of the temperature emulation assembly 104 representing a coldest location of the temperature emulation assembly 104 (e.g., the coldest thermally conductive plate 146) is matched with a coldest temperature profile of the composite structure representing a coldest location of the composite structure. The two locations of the temperature emulation assembly 104 (e.g., the two selected thermally conductive plates 146) used during temperature emulation and measurement (block 324) are the hottest location of the temperature emulation assembly 104 (e.g., the hottest thermally conductive plate 146) and the coldest location of the temperature emulation assembly 104 (e.g., the coldest thermally conductive plate 146).

Thus, once the two locations of the temperature emulation assembly 104 (e.g., the two thermally conductive plates 146) have been selected that represent the hottest and coldest locations of the composite structure, the apparatus 100 can repeatedly be used to emulate additional composite structures having the same configuration (e.g., dimensions, layup configuration, materials and the like).

However, during initial calibration of the apparatus 100, for example, during generation of the temperature profiles of the temperature emulation assembly 104 (block 328) and matching of the hottest and coldest temperature profiles (blocks 330 and 332), various configuration and/or arrangements of the plurality of thermal plates 146 may need to be tested to find matching temperature profiles. When no suitable temperature profiles of the temperature emulation assembly 104 match the temperature profiles of the composite structure, the plurality of thermally conductive plates 146 may be rearranged in the stack 148, as shown at block 306. As an example, the number of thermally conductive plates 146 may be varied (e.g., increased or decreased) and/or the thickness of one or more of the thermally conductive plates 146 may be varies (e.g., increased or decreased). Following rearrangement of the thermally conductive plates 146 in the stack 148, the steps shown at blocks 326, 328, 330 and 332 may be repeated.

Additionally, as shown at block 334, the rate of conductive heat transfer through the temperature emulation assembly 104 from the temperature emulation assembly-leading end 142 to the temperature emulation assembly-lagging end 144 of the temperature emulation assembly 104 may be controlled. As an example, introduction of and/or varying the thickness of the insulator layers 178 within the stack 148 may control the rate of conductive heat transfer through the temperature emulation assembly 104.

This process may also be repeated when the apparatus 100 is used to emulate a different composite structure having a different configuration than the composite structure the apparatus 100 was previously calibrated to emulate.

Accordingly, the disclosed apparatus 100 is configured to provide temperature outputs representative of, or emulating, the hottest and coldest locations of the composite structure being thermally cured. The features of the enclosure assembly 102 and the temperature emulation assembly 104 provide for the control of the mode of heat transfer and the direction of heat transfer through the temperature emulation assembly 104.

Figure 19:
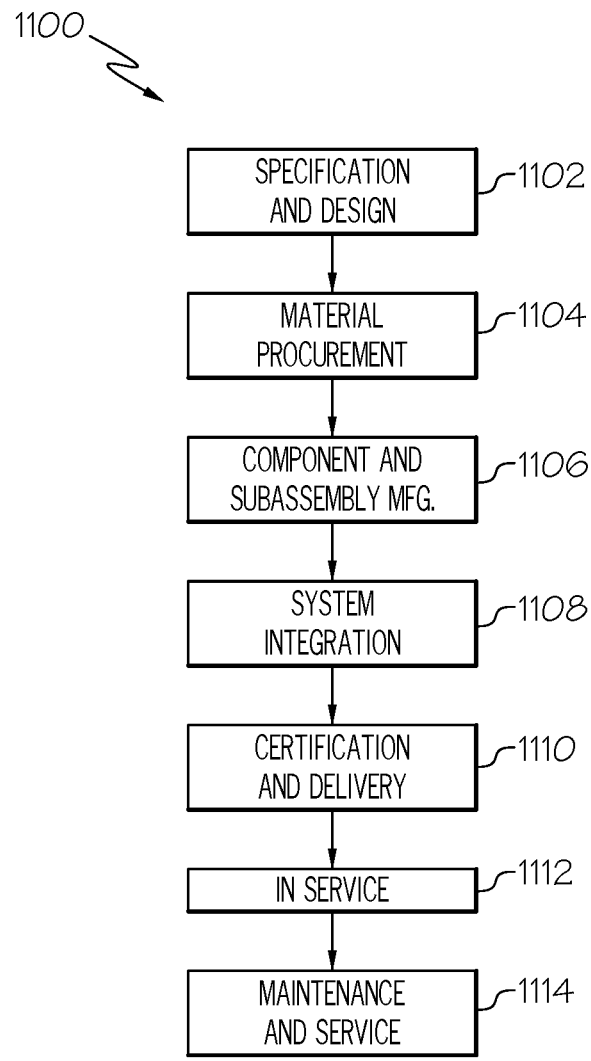
FIG. 19 is a schematic illustration of an aircraft.
Figure 20:
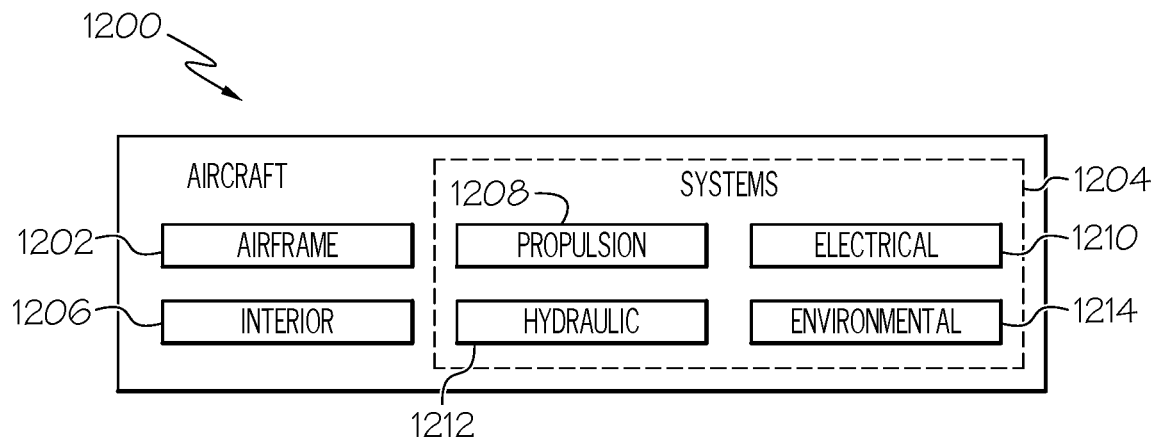
FIG. 20 is a schematic block diagram of aircraft production and service methodology.

Examples of the disclosed apparatus 100 and methods disclosed herein may find use in a variety of potential composite fabrication applications, particularly in the transportation industry, including for example, aerospace, marine and automotive applications. Thus, referring now to FIGS. 19 and 20, examples of the apparatus 100 and methods may be used in the context of an aircraft manufacturing and service method 1100, as shown in FIG. 19, and an aircraft 1200, as shown in FIG. 20. Aircraft applications of the disclosed examples may include any composite structure subjected to a thermal cure cycle and used during manufacturing of the aircraft 1200.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of the aircraft 1200 may take place. Thermal curing of the composite structure using the apparatuses 100 and methods, as described herein, may be accomplished as a portion of the production, component and subassembly manufacturing step (block 1106) and/or as a portion of the system integration (block 1108), for example, to fabricate the composite structure used to manufacture the aircraft 1200. Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of the aircraft 1200. Thermal curing of the composite structure using the apparatuses 100 and methods, as described herein, may be accomplished as a portion of the routine maintenance and service step (block 1114), for example, to fabricate the composite structure used to maintain or service the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 20, the aircraft 1200 produced by the illustrative method 1100 may include an airframe 1202, for example, having one or more thermally cured composite structures fabricated using the apparatuses 100 and methods, as described herein, a plurality of high-level systems 1204 and an interior 1206, for example, having one or more thermally cured composite structures fabricated using the apparatuses 100 and methods, as described herein. Examples of the high-level systems 1204 include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while the aircraft 1200 is in service (block 1112). Also, one or more examples of the systems, apparatus, and methods, or combination thereof may be utilized during production stages (blocks 1108 and 1110). Similarly, one or more examples of the systems, apparatus, and methods, or a combination thereof, may be utilized, for example and without limitation, while the aircraft 1200 is in service (block 1112) and during maintenance and service stage (block 1114).

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual. For example, the phrase "A is substantially the same as B" may encompass examples where A is exactly the same as B, or where A may be within a variance of +/−5%, for example of a value, of B, or vice versa.

As used herein, the terms "partially" or "at least a portion of" may represent an amount of a whole that includes an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

In FIG. 20, referred to above, solid lines, if any, connecting various elements and/or components represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines are either selectively provided or relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 20 may be combined in various ways without the need to include other features described in FIG. 20, other drawing figures, and/or the accompanying disclosure, even though such combination or combinations are not explicitly illustrated herein. Similarly, additional features not limited to the examples presented, may be combined with some or all of the features shown and described herein.

In FIGS. 16-19, referred to above, the blocks may represent operations and/or portions thereof and lines connecting the various blocks do not imply any particular order or dependency of the operations or portions thereof. Blocks, if any, represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 16-19 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed apparatus, systems and methods have been shown and described, modifications may occur to those skilled in the art upon reading the specification. The present application includes such modifications and is limited only by the scope of the claims.

What is claimed is:

1. A method comprising:
   heating, with a heating system, an apparatus comprising an enclosure assembly and a temperature emulation assembly positioned within said enclosure assembly;
   thermally isolating said temperature emulation assembly from said heating system with said enclosure assembly;
   permitting conductive heat transfer to said temperature emulation assembly, via said enclosure assembly heated by said heating system, only through an enclosure assembly-leading end of said enclosure assembly; and
   representing a hottest temperature and a coldest temperature of an article being emulated by said apparatus with said temperature emulation assembly.

2. The method of claim 1, further comprising assembling said apparatus, comprising:
   arranging an inner enclosure within an outer enclosure of the enclosure assembly;
   arranging a plurality of thermally conductive plates in a stack within said inner enclosure;
   positioning one of said plurality of thermally conductive plates at a stack-leading end in contact with a leading end faceplate of said outer enclosure;
   arranging an insulator between outer enclosure-sidewalls of said outer enclosure and inner enclosure-sidewalls of said inner enclosure;
   arranging a thermal barrier between an outer enclosure-lagging end faceplate of said outer enclosure and an inner enclosure-lagging end faceplate of said inner enclosure; and
   arranging a thermal disruptor between said inner enclosure-sidewalls of said inner enclosure and said stack of said plurality of thermally conductive plates.

3. The method of claim 1, further comprising:
   generating a virtual thermal profile for a thermal model of said article;
   generating a virtual thermal profile for a thermal model of said temperature emulation assembly;
   comparing said virtual thermal profile for said thermal model of said temperature emulation assembly with said virtual thermal profile for said thermal model of said article; and
   reconfiguring said temperature emulation assembly when said virtual thermal profile for said thermal model of said temperature emulation assembly does not match said virtual thermal profile for said thermal model of said article.

4. The method of claim 1, further comprising inhibiting said conductive heat transfer to said temperature emulation assembly along any conductive heat transfer path except through enclosure assembly-leading end of said enclosure assembly.

5. The method of claim 1, further comprising inhibiting convective heat transfer to said temperature emulation assembly along any convective heat transfer path.

6. The method of claim 1, further comprising inhibiting radiative heat transfer to said temperature emulation assembly along any radiative heat transfer path.

7. The method of claim 1, further comprising measuring temperatures of two locations of said temperature emulation assembly throughout a heating cycle, wherein measured temperatures of said two locations of said temperature emulation assembly represent said hottest temperature and said coldest temperature of said article being emulated by said apparatus.

8. The method of claim 7, further comprising using said measured temperatures as inputs to control a temperature within said heating system and regulate a temperature of said article being emulated by said apparatus during said heating cycle.

9. The method of claim 8, further comprising:
generating a thermal profile for said article;
generating a thermal profile of said temperature emulation assembly;
matching a first temperature of said thermal profile of said temperature emulation assembly with a hottest temperature of said thermal profile of said article; and
matching a second temperature of said thermal profile of said temperature emulation assembly with a coldest temperature of said thermal profile of said article, and
wherein said two locations of said temperature emulation assembly are selected to correspond to said first temperature and said second temperature of said thermal profile of said temperature emulation assembly.

10. The method of claim 1, further comprising conductively transferring heat through said temperature emulation assembly from a temperature emulation assembly-leading end positioned proximate to said enclosure assembly-leading end to a temperature emulation assembly-lagging end.

11. The method of claim 10, further comprising controlling a rate of said conductive heat transfer through said temperature emulation assembly from said temperature emulation assembly-leading end to said temperature emulation assembly-lagging end of said temperature emulation assembly.

12. The method of claim 10, further comprising inhibiting convective heat transfer along said temperature emulation assembly from said temperature emulation assembly-leading end to said temperature emulation assembly-lagging end of said temperature emulation assembly.

13. The method of claim 12, further comprising inhibiting radiative heat transfer along said temperature emulation assembly from said temperature emulation assembly-leading end to said temperature emulation assembly-lagging end of said temperature emulation assembly.

14. A method comprising:
heating, with a heating system, an apparatus comprising:
an enclosure assembly comprising an enclosure assembly-leading end and an opposed enclosure assembly-lagging end; and
a temperature emulation assembly mounted within said enclosure assembly and comprising a temperature emulation assembly-leading end located proximate to said enclosure assembly-leading end and a temperature emulation assembly-lagging end spaced away from said enclosure assembly-lagging end,
wherein said enclosure assembly thermally isolates said temperature emulation assembly and permits conductive heat transfer to said temperature emulation assembly, via said enclosure assembly, only through said enclosure assembly-leading end;
thermally isolating said temperature emulation assembly from said heating system with said enclosure assembly;
permitting conductive heat transfer to said temperature emulation assembly, from said heating system, only through said enclosure assembly-leading end of said enclosure assembly; and
representing a hottest temperature and a coldest temperature of an article being emulated by said apparatus with said temperature emulation assembly.

15. The method of claim 14, further comprising inhibiting said conductive heat transfer to said temperature emulation assembly along any conductive heat transfer path except through said enclosure assembly-leading end of said enclosure assembly.

16. The method of claim 14, further comprising inhibiting convective heat transfer to said temperature emulation assembly along any convective heat transfer path.

17. The method of claim 14, further comprising inhibiting radiative heat transfer to said temperature emulation assembly along any radiative heat transfer path.

18. The method of claim 14, further comprising measuring temperatures of two locations of said temperature emulation assembly throughout a heating cycle, wherein measured temperatures of said two locations of said temperature emulation assembly represent said hottest temperature and said coldest temperature of said article being emulated by said apparatus.

19. The method of claim 18, further comprising using said measured temperatures as inputs to control a temperature within said heating system and regulate a temperature of said article being emulated by said apparatus during said heating cycle.

20. The method of claim 19, further comprising:
generating a thermal profile for said article;
generating a thermal profile of said temperature emulation assembly;
matching a first temperature of said thermal profile of said temperature emulation assembly with a hottest temperature of said thermal profile of said article; and
matching a second temperature of said thermal profile of said temperature emulation assembly with a coldest temperature of said thermal profile of said article, and
wherein said two locations of said temperature emulation assembly are selected to correspond to said first temperature and said second temperature of said thermal profile of said temperature emulation assembly.

* * * * *